United States Patent
Elliot et al.

(12) 
(10) Patent No.: US 6,587,470 B1
(45) Date of Patent: Jul. 1, 2003

(54) FLEXIBLE CROSS-CONNECT WITH DATA PLANE

(75) Inventors: Paul M. Elliot, Jenner, CA (US); Ajaib S. Bhadare, Rohnert Park, CA (US); Dyke T. Shaffer, Santa Rosa, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/274,078

(22) Filed: Mar. 22, 1999

(51) Int. Cl.$^7$ ............................................. H04L 12/28
(52) U.S. Cl. ....................................... 370/404; 370/907
(58) Field of Search ................................. 370/218, 221, 370/225, 388, 401, 404, 405, 465, 466, 539, 907, 380, 386, 384, 425; 359/109, 115, 117; 340/2.2, 2.28

(56) References Cited

U.S. PATENT DOCUMENTS

| | | | |
|---|---|---|---|
| 4,967,405 A | | 10/1990 | Upp et al. |
| 4,998,242 A | | 3/1991 | Upp |
| 5,040,170 A | | 8/1991 | Upp et al. |
| 5,185,736 A | * | 2/1993 | Tyrrell et al. ............... 370/509 |
| 5,315,594 A | * | 5/1994 | Noser ......................... 370/353 |
| 5,497,363 A | * | 3/1996 | Gingell ....................... 370/466 |
| 5,848,065 A | * | 12/1998 | Gorshe et al. .............. 370/539 |
| 6,160,806 A | * | 12/2000 | Cantwell et al. ............ 370/466 |

OTHER PUBLICATIONS

Technical Note, The Fundamentals of SONET, Telecommunications Techniques Corporation, pp. 1–28, Nov. 1994.*

Chin et al, SONET Implementation, IEEE, pp. 34–40, Sep. 1993.*

DeWilde et al, Integrated Switch and Cross–Connect Systems as a Flexible Transport Network, IEEE, pp. 675–678, Mar. 1988.*

* cited by examiner

*Primary Examiner*—Seema S. Rao
*Assistant Examiner*—Frank Duong
(74) *Attorney, Agent, or Firm*—Ritter, Lang & Kaplan LLP

(57) ABSTRACT

A flexible cross-connect with a data plane is presented which allows the establishment of connections between network interfaces at any network interface card to another network interface on any other network interface card. The system can cross-connect connections at an STS-1 and VT 1.5 granularity, and allows the switching and routing of information in a data plane without the use of the cross connect fabric. This permits routing, bridging, and concentration of data services to be performed without burdening of the cross connect. For reliability, a range of protection configurations can be employed including 1:1, 1:5 and mixed 1:N protection. A backplane is used which provides point-to-point traces between each card and the cross connect unit, between each card and a timing, communications and control unit, and between the network interface cards themselves.

11 Claims, 18 Drawing Sheets

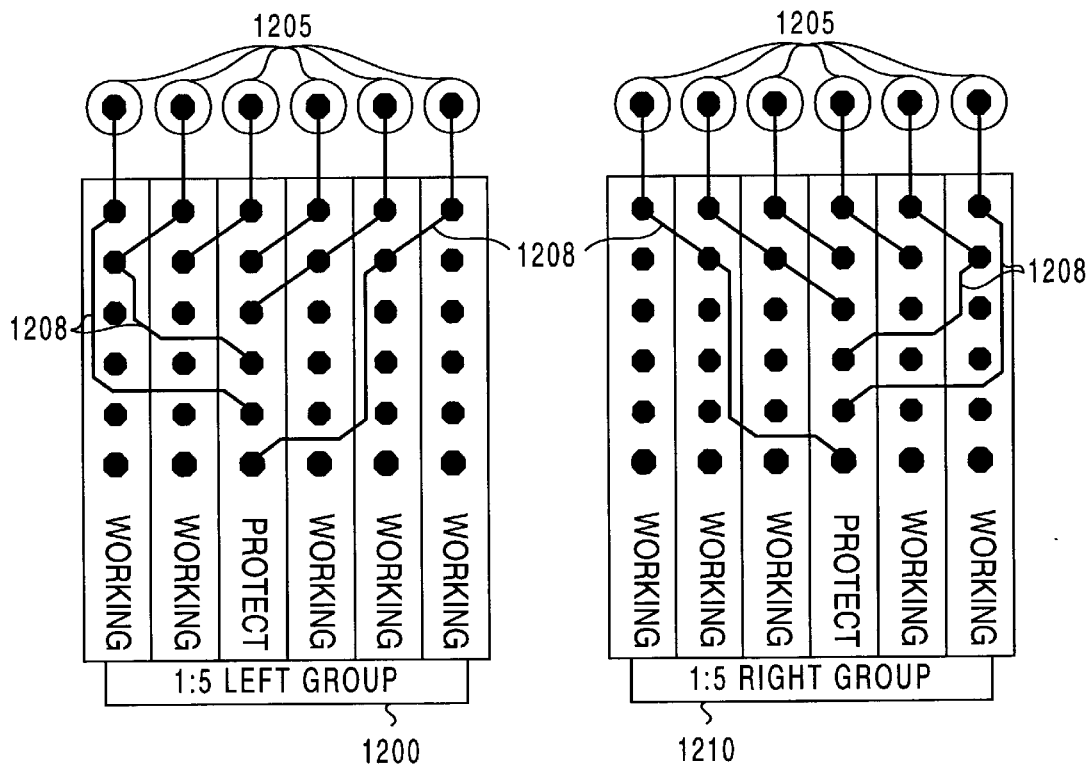
FIG. 12A
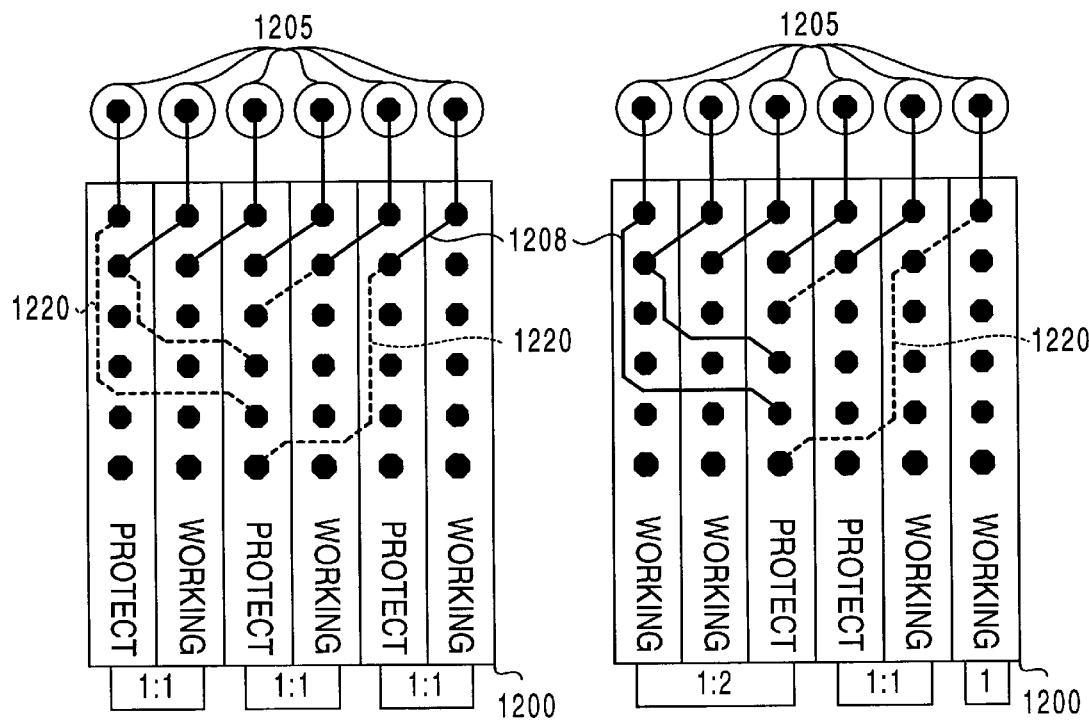
FIG. 12B  FIG. 12C

FLEXIBLE CROSS-CONNECT WITH DATA PLANE

BACKGROUND OF THE INVENTION

Telecommunications systems are carrying increasing amounts of information, both in the long distance network as well as in metropolitan and local area networks. At present data traffic is growing much faster than voice traffic, and will include high bandwidth video signals. In addition to the requirement for equipment to carry increasing amounts of telecommunications traffic there is a need to bring this information from the long distance network to businesses and to locations where it can be distributed to residences over access networks.

The equipment which has been developed to carry large amounts of telecommunications traffic includes fiber optic transport equipment which can carry high speed telecommunications traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The ability to carry large amounts of telecommunications traffic on an optical fiber solves the long-distance point-to-point transport problem, but does not address the issue of how to add and remove traffic from the high-speed data stream. Equipment for adding and removing traffic has been developed and is referred to as "add-drop" multiplexing equipment.

Traditional designs for add-drop multiplexers are based on the use of multiple interface cards which receive high speed data streams, create a time division multiplex signal containing the multiple data streams, and route the time division multiplex signal to a cross-connect unit which can disassemble the data streams, remove or insert particular data streams, and send the signal to another interface card for transmission back into the networks. By aggregating the multiple data streams into a time division multiplexed data signal, the data rate of the time division multiplexed signal is by definition several times the rate of the maximum data rate supported by the interface cards. Such solutions have proven adequate for interface data rates in the range of 155 Mb/s to 622 Mb/s, but for data rates over 1 Gb/s there are a number of problems which arise due to the transport of and timing of the multiplexing and transmission of the high speed signals between cards in the cross-connect. Optical signals of 2.4 Gb/s have become a standard and there is a need for cross-connect equipment which can support multiple 2.4 Gb/s data streams.

Standardized interfaces and transmission hierarchies for telecommunications signals have been developed and include the pleisochronous digital hierarchy (PDH) standards, the Synchronous Digital Hierarchy (SDH) standards, and the Synchronous Optical Network (SONET) standards. In addition to these telecommunications transport standards and systems data standards and systems have been developed for interconnecting businesses and computers within businesses. These metropolitan and local area network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels. Although individual pieces of equipment can be purchased to support telecommunications or MAN/LAN standards, these devices generally either connect data streams using a signal protocol or convert entire data streams from one protocol to another. There is a need for a device which can establish interconnectivity between interfaces at the MAN/LAN level, while providing cross-connection to the telecommunications PDH/SDH/SONET network.

Multiple interfaces are presently supported in cross-connect equipment by the use of different interface cards. For high-speed signals, these cards must be inserted into particular slots in order to insure that the signal can be transported between the interface card and the cross-connect unit and to another interface card. It would be desirable to have a cross-connect system in which cards can support high-speed optical signals of at least 2.4 Gb/s in any card slot.

It would also be useful to have a system which would support routing, bridging, and concentration functions within MANs/LANs, as well as permitting access to the telecommunications PDH/SDH/SONET network.

Because of the high data rates and amount of traffic carried in the telecommunications signals, it is necessary to insure that there are redundant interface units in the cross-connect, and that a protect interface card can be used if a working interface card fails.

For the foregoing reasons, there is a need for flexible cross-connect with a data plane that can support multiple high speed optical interfaces in any card slot, can establish connectivity between data cards and the transport network and which provides adequate protection against failed units.

SUMMARY OF THE INVENTION

The present invention provides a flexible cross-connect architecture with a data plane based on use of interface cards which are inserted into card slots connecting to a backplane which provides point-to-point connectivity between each card and centralized cross-connect and timing, communications, and control units. The cross-connect unit can establish connections between any interface card and any other interface card, or between an interface card and itself.

A star backplane is utilized in which point-to-point connections are established between network interface cards and common cards including a cross-connect card and redundant cross-connect card, and a timing, communications and control card and redundant timing, communications and control card. In addition, the star backplane supports point-to-point connections between the network interface cards, allowing the creation of a data plane which does not require use of the cross-connect to route data.

In a preferred embodiment the interface cards support a variety of data and telecommunications interfaces including SONET OC-192 interfaces operating at 9.95 Gb/s. The point-to-point connections between the interface cards and the cross-connect operate over a parallel 32 bit data bus, operating at 311 MHz and supporting transport of STS-192 payloads. In an alternate embodiment a limited number of card slots support STS-192 data rate connections to the cross-connect, while all of the card slots support STS-48 connections to the cross-connect.

The present invention utilizes a backplane which supports direct connections between interface cards, allowing for the creation of a data plane in the form of a fully or partially connected mesh. One advantage of the data plane is that signals can be routed between interface cards without use of the cross-connect in order to realize bridging, routing, and other MAN/LAN functions without encumbering the cross-connect.

Another advantage of the data plane is that traffic signals can be aggregated in the data plane and routed to the telecommunications network. As an example, Ethernet data can be aggregated on one or more interface cards which form part of the data plane. The aggregated traffic can be used to fill a DS-3, STS-1 or other signal which forms part of a SONET channel. The cross-connect can insert the aggregated signal into a higher level SONET signal for transport on the telecommunications network. This feature allows for the cost effective use of the equipment and alleviates the need for a customer to lease an expensive high speed optical signal for a limited amount of data traffic.

The present invention supports a cross-connect unit, a control unit, a plurality of interface cards, and has a plurality of interface card slots which are connected to a backplane. The backplane establishes point-to-point connections between the interface cards and the control unit and between the interface cards and the cross-connect such that any signal from an interface unit can be cross-connect with a signal from another interface unit, independent of the slots in which the interface units are located.

In a preferred embodiment a variety of interface cards are used to support electrical connections including Ethernet, ATM, PDH and SDH rates, as well as optical connections at rates up to STS-192. In a preferred embodiment any interface card can be located in any interface card slot and signals from a card can be cross-connected with any other signal including a signal from that card itself.

In an alternate embodiment optical connections of up to OC-48 are supported in any interface card slot, and optical connections of OC-192 are supported in particular slots.

An advantage of the present invention is that multiple SONET rings can be supported from one piece of equipment, since cross-connections can be established between separate rings at the cross-connect.

In a preferred embodiment cross-connection is performed at high speed by pre-aligning signals on the interface cards to create a frame aligned signal which arrives at the cross-connect. Pre-aligning the signal can be accomplished through the use of a programmable offset located on each interface card and controlled by a central timing, communications, and control unit.

A feature of the present invention is the ability of the cross-connect to break the signal down to its lowest common denominator to subsequently perform the cross connection. In a preferred embodiment the cross-connection is done at a VT 1.5 level while in an alternate embodiment the cross connection is performed at the STS-1 level.

A feature of the present invention is the ability to protect against failed interface cards (electrical protection). In a preferred embodiment this is accomplished by establishing connections on the backplane which connect each card with an outwardly adjacent card, as well as providing connectivity to a designated protect card. Traces are established on the backplane which permit the system to be configured for 1:1, 1:5 or simultaneous 1:2, 1:1, 1:N, and unprotected protection schemes on each side of the cross-connect. The timing, communications, and control unit can be utilized to monitor for failed devices and control use of a protect card.

An advantage of the present invention is that protect cards can be used to carry traffic when not being used by the working card. Another advantage of the present invention is the ability to change the working:protect ratio without modification of cards or the backplane.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 12A–12C illustrate electrical protection schemes;

DETAILED DESCRIPTION OF THE PREFERRED EMBODIMENT

Figure 1:
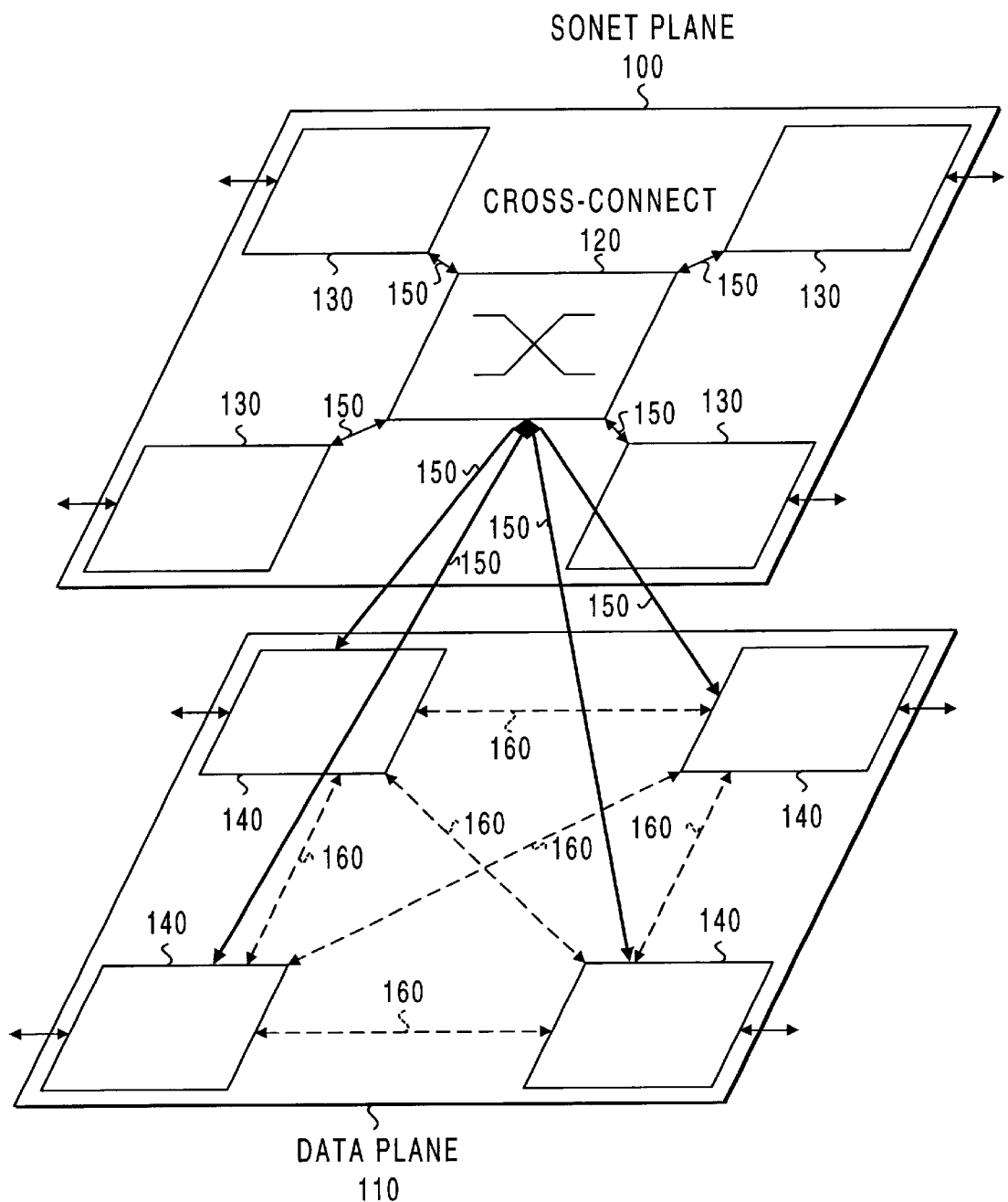
FIG. 1 illustrates the system architecture including the SONET cross-connect and data planes.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 14 in particular, the apparatus of the present invention is disclosed.

The present invention supports a number of telecommunications and networking standards including those described and defined in the following references: Bellcore Standard GR-253 CORE, Synchronous Optical Network (SONET) Transport Systems: Common Generic Criteria, Issue 2, December 1995; GR-1230 CORE, SONET Bidirectional Line-Switched Ring Equipment Generic Criteria, Issue 3A, December 1996, Bellcore TR-NWT-000496, SONET Add-Drop Multiplex Equipment (SONET ADM) Generic Criteria, Issue 3, May 1992; Bellcore Transport System Generic Requirements FR-440, Issue No. 98, September 1998; IEEE/ANSI 802.3 Ethernet LAN specification; and Networking Standards, by William Stallings, published by Addison-Wesley Publishing Company (New York, 1993), all of which are incorporated herein by reference.

Outline of the detailed description
I. System Overview
  A. System architecture
  B. Backplane design
  C. Cross-connect subsystem
  D. Timing communications and control subsystem
  E. System Communications Link (SCL)
  F. Data timing and alignment
  G. Software architecture
II. Redundancy and protection
III. System transport configurations I. System Overview FIG. 1 illustrates a block diagram of the flexible cross-connect and data plane system capable of routing traffic across two high-bandwidth planes. The system includes a SONET plane 100 and a data plane 110. A centralized fully non-blocking cross-connect (XC) 120 located in the SONET plane 100 interfaces with SONET plane network interface subsystems 130 and data plane network interface subsystems 140. Standardized SONET, SDH and PDH telecommunications traffic enters the system through SONET plane network electrical and optical interface subsystems 130 and, through point-to-point connections 150 to the XC 120, is processed by the XC 120 before being returned to the network through a SONET plane network interface subsystem 130 or a data plane network interface subsystem 140.

Standardized SONET, SDH, and PDH signals include, but are not limited to, DS-1 (1.5 Mb/s), B-ISDN (1.5Mb/s) DS-2 (6.3 Mb/s), DS-3 (44.7 Mb/s), CEPT-1 (2.048 Mb/s), CEPT-2 (8.45 Mb/s), CEPT-3 (34.37 Mb/s), CEPT-4 (139.3 Mb/s), electrical a, STS-1 and its multiples, electrical STM-1 and its multiples, and optical OC-1 and its multiples. Other standardized and non-standardized transmission signal formats can be supported and are understood by those skilled in the art.

As in the SONET plane 100, data plane network interface subsystems 140 interconnect 150 to the XC 120 for processing by the XC 120 before being returned to the network. The data plane 110 also allows for processing and interconnection 160 between data plane network interface subsystems 140 before being returned to the network or before being interconnected through network interface subsystem to cross-connect connections 150 to the XC 120 for additional processing and before being returned to the network.

The interconnected mesh formed by interconnecting data plane network interface subsystems 140 using data plane network subsystem interface connections 160 defines data plane 110. Data plane network interface signals include packet data transport formats such as Frame Relay and ATM, MAN/LAN formats including Ethernet, FDDI, or Token Ring. The interfaces supported by data plane network interface subsystems include electrical Ethernet interfaces such as 10BaseT and 100BaseT, as well as optical interfaces for 1000BaseT and Gigabit Ethernet. Other data-centric interfaces can be used and are understood by those skilled in the art.

In a preferred embodiment, network interface subsystem to cross-connect connections 150 between the XC 120 and the SONET plane network interface subsystems 130 or between the XC 120 and a data plane network interface subsystems 140 are in a single specified format. In a preferred embodiment the network interface subsystem to cross-connect connections 150 are realized as STS-192 formatted signals transported on a multi-trace electrical bus formed on a high-speed backplane.

Figure 2:
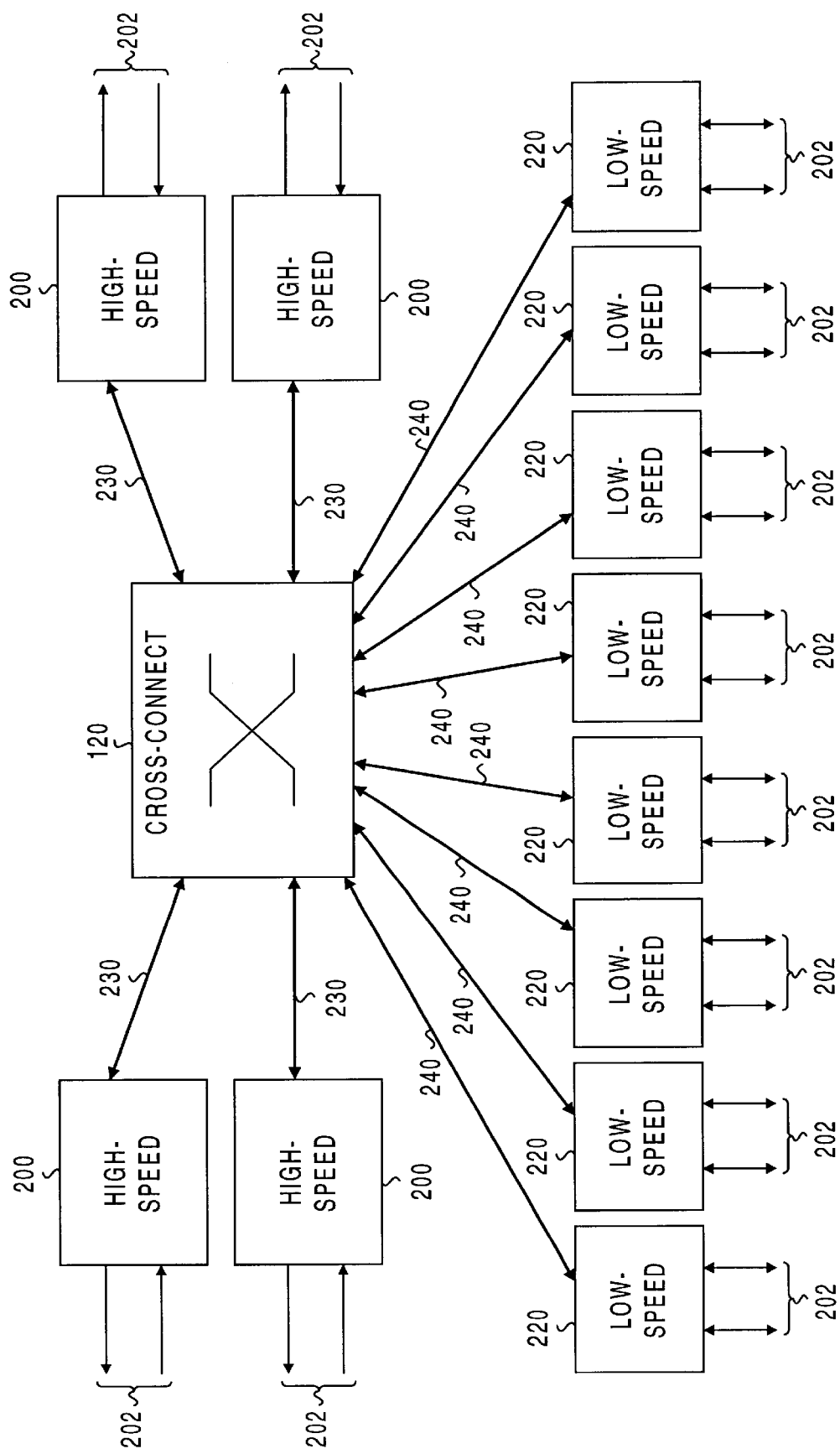
FIG. 2 illustrates a centralized cross-connect and star connectivity to interface cards.

An alternate embodiment of the flexible cross-connect is realized in FIG. 2. As shown in FIG. 2, specific network interface subsystems are designated as high-speed interface subsystems 200 and others are designated as low-speed interface subsystems 220 having corresponding high-speed connections 230 and low-speed connections 240 to the XC 120. In this embodiment the low-speed interconnections operate at the STS-48 rate of 2.488 Gb/s, while the high speed interconnections 230 operate at the STS-192 rate of 9.953 Gb/s.

In a preferred embodiment high speed network interface subsystems 200 are realized as printed circuit boards containing active and passive electrical and optical components, and can contain multiple network interfaces 202 operating at the same or different speeds. Low speed network interface subsystems 220 are also realized as printed circuit boards with active and passive electrical and optical components, and can contain multiple network interfaces 202 operating at the same or different speeds. As an example, a low speed network interface subsystem 220 can be realized as a DS-1 interface board supporting 14 DS-1 interfaces. Alternatively, a low speed network interface subsystem can be realized as an Ethernet board supporting multiple Ethernet interfaces.

Figure 3:
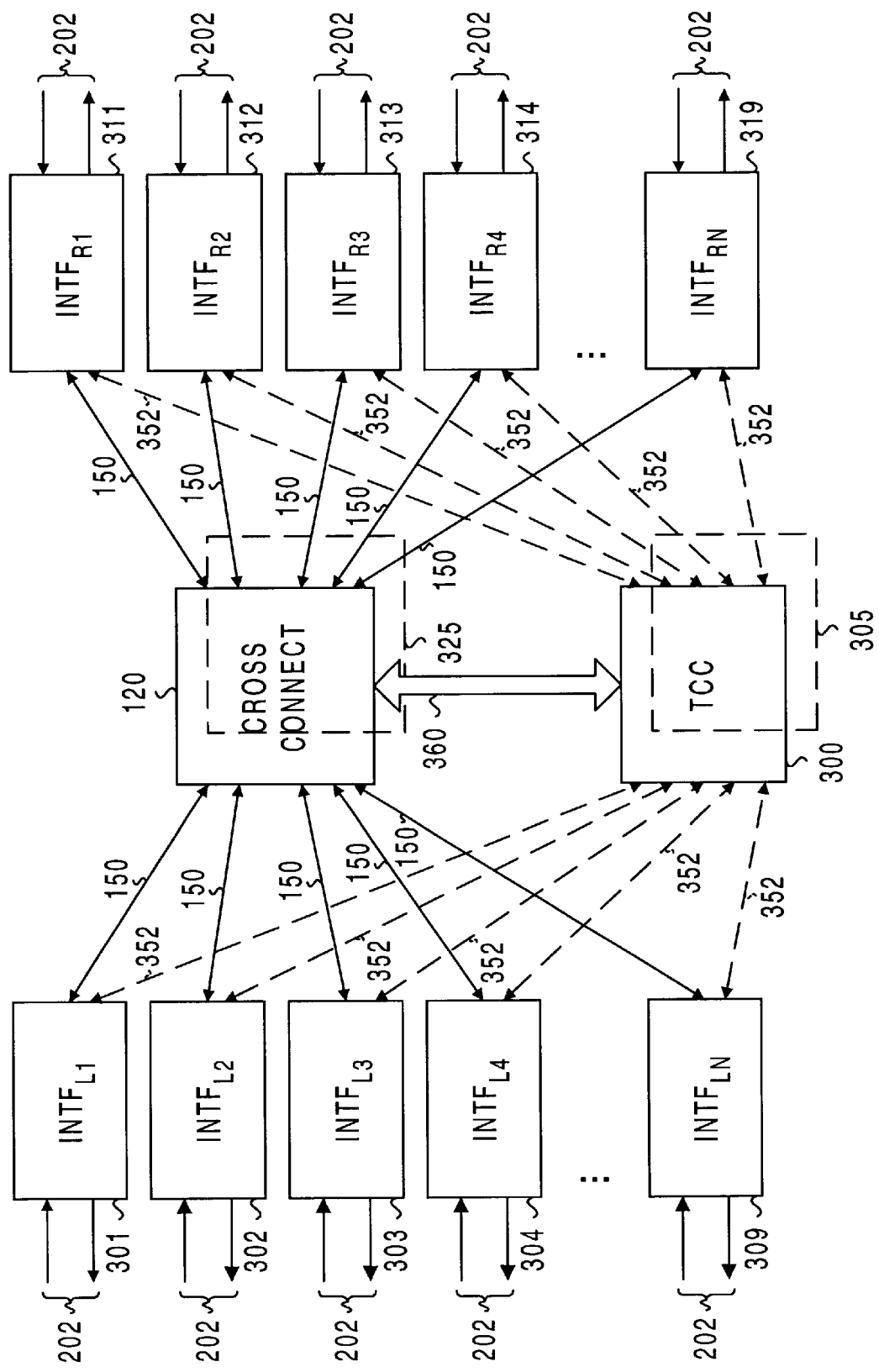
FIG. 3 illustrates centralized control including cross-connect, timing, communications, and control unit, and redundant units.

FIG. 3 illustrates a block diagram of a preferred embodiment of the present invention. As shown in FIG. 3, the XC 120 has direct point-to-point network interface subsystem to cross-connect connections 150 to interface subsystems 301, 302, 303, 304, 309, 311, 312, 313, 314, 319. Each of the interface subsystems 301–304, 309, 311–314, 315 represents an interface card which is either of the class of cards which are SONET plane network interface subsystems 130 or which are data plane network interface subsystems 140. The designation L and R in network interface subsystems 301–304, 309, 311–314, 315 are used to designate the left-hand side and right hand-side of a mechanical configuration, but are not intended to be architectural limitations.

Referring to FIG. 3, there are multiple point-to-point system communication links 352 between a centralized timing, control, and communications subsystem (TCC) 300 to each of the interface subsystems 301–304, 309, 311–314, 315. The TCC 300 is also directly connected to XC 120 via the TCC to XC communication bus 360. In a preferred embodiment the system has a redundant XC 325 and a redundant TCC 375.

Figure 4A:
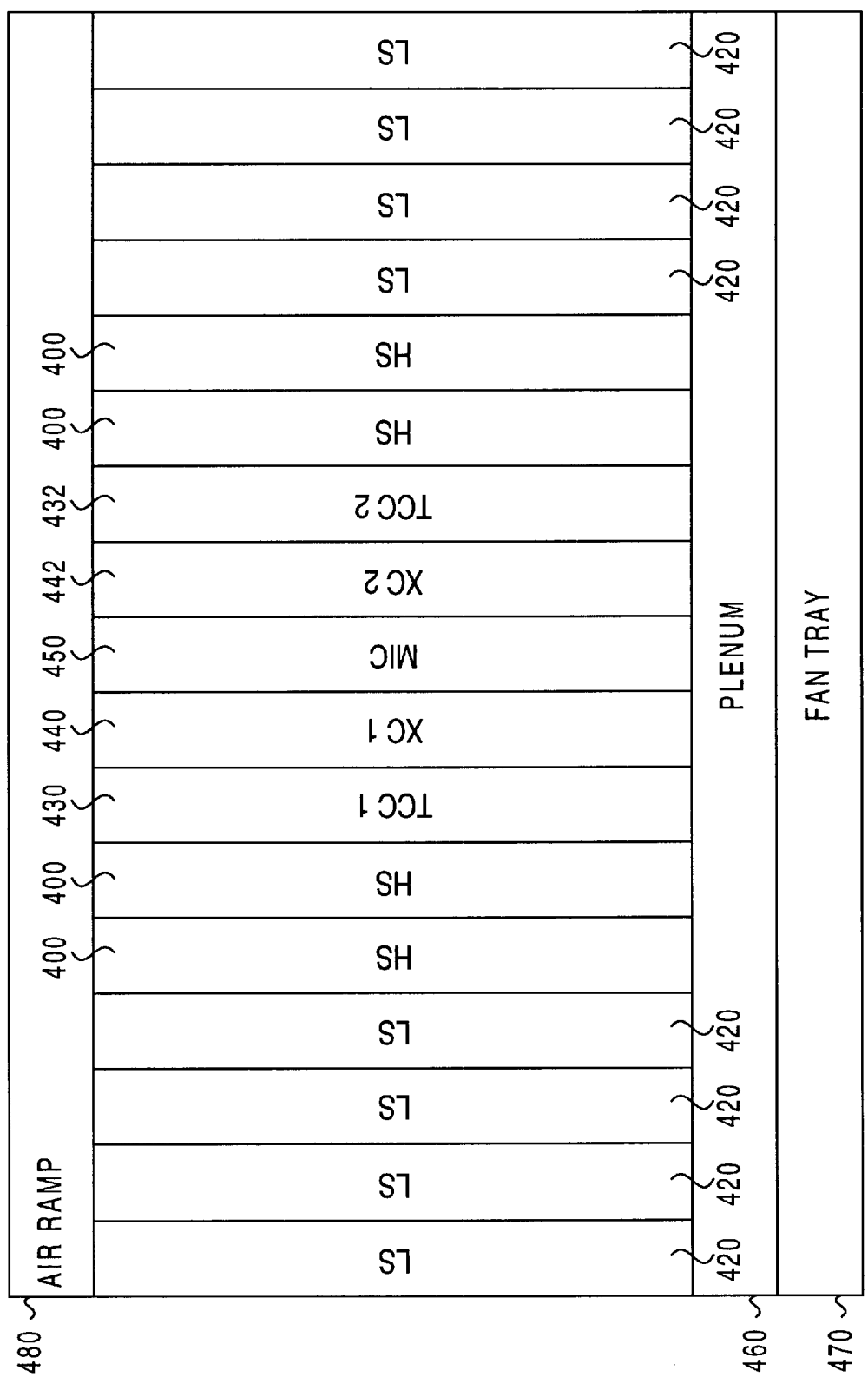
FIGS. 4A and 4B illustrates the mechanical (rack) configuration of the apparatus.

In a preferred embodiment the cross-connect is formed by utilizing a backplane in a mechanical rack with card slots, each card slot permitting the insertion of one or more types of cards. Card slots terminate at connectors installed in the backplane. Connections in the backplane form the connections illustrated as network interface subsystem to cross-connect connections 150 and data plane network subsystem connections 160. FIG. 4A illustrates a card configuration for the system.

In a preferred embodiment data plane 110 has 160 Gb/s aggregate bandwidth to support communications between data plane network interface subsystems 140. In a preferred embodiment this capacity is realized by 1 and 3 Gb/s point-to-point links between network interface cards which form the data plane network interface subsystems 140. In a preferred embodiment data plane 100 has an extremely low latency, fully meshed, point-to-point fabric between each network interface card to provide a fully non-blocking data switch backplane.

The SONET plane 100 is formed by point-to-point connections between the network interface card slots and a card slot supporting a cross-connect unit. In a preferred embodiment a fully non-blocking cross-connect module located in the XC slot can groom traffic in STS-1 or VT1.5 payload increments to any port on any card. This maximizes bandwidth efficiency by making it possible to groom SONET traffic in STS-1 or VT1.5 increments. In a preferred embodiment XC unit 120 supports all VT 1.5 through STS-192 applications. Using the redundant cross-connect slots, the system can also be configured as a fully protected stand-alone bandwidth manager.

The system handles all traffic transparently and can consolidate a combination of TDM, ATM, and Ethernet/IP traffic over SONET protocol. Because every interface card from DS-1 to OC-192 can be installed in a single shelf, each terminal can provide access and transport interfaces. The system can be deployed in a number of network configurations including Terminal Mode (TM), Add-Drop Multiplexor (ADM), Regenerator, and SONET Ring.

A. System architecture

In a preferred embodiment the system is realized as a rack with card slots, as illustrated in FIG. 4A. The rack consists of a card cage, a backplane, and set of plug-in cards. FIG. 4A illustrates arrangement of cards in a preferred embodiment using a backplane and card cage hosting 17 cards. Mechanical card guides and backplane connectors 801 on backplane 800 form card slots. The card slots in the card cage are numbered from 1 to 17, left to right. The plug-in cards are grouped into two general groups. The first group is the common equipment cards, which include XC card 440, redundant XC card 442, TCC card 430, redundant TCC card 432, and the miscellaneous interface card (MIC card) 450. The second group comprises the network interface cards 810 and includes low speed cards 420 and high speed cards 400, which form SONET plane network interface subsystems 130 and data plane network interface subsystems 140 XC 120 is realized as a XC card 440 located in a slot towards the center, as shown in FIG. 4A. A redundant XC 325 is realized as a redundant XC card 442 located in a card slot towards the center. A timing, communications, and control (TCC) unit 300 and a redundant TCC unit 375 are realized as TCC card 430 and redundant TCC card 432, also located in card slots towards the center of the system.

Figure 4B:
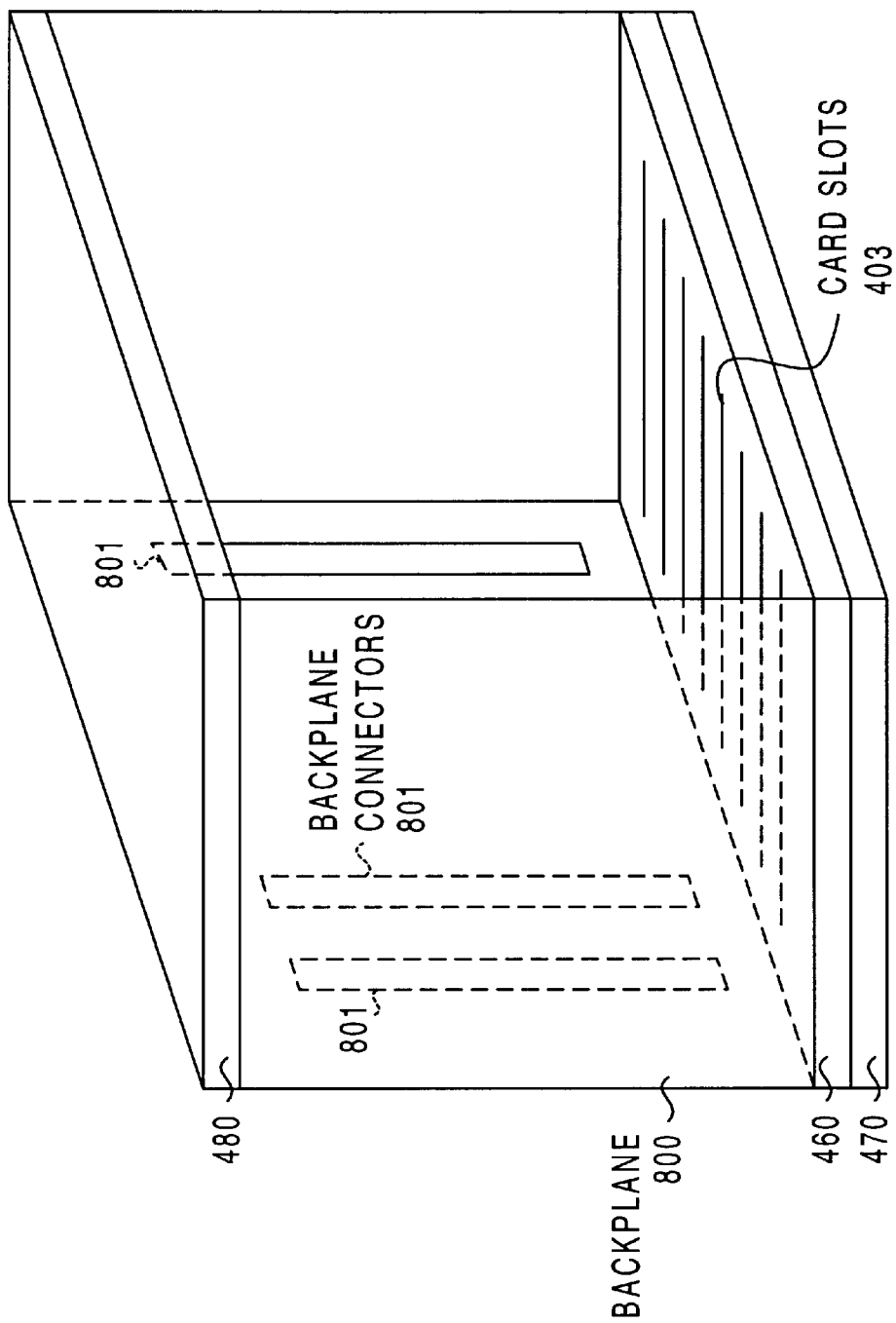

FIG. 4B illustrates another view of a preferred embodiment of the mechanical configuration of the system, and includes the backplane 800 and backplane connectors 801.

As shown in FIG. 4A, high speed network interface cards 400 and low speed network interface cards 420 are supported. In one embodiment high speed network interface cards 400 support one or more electrical and optical interfaces up to OC-192 data rates, while low speed network interface cards 420 support data rates of up to OC-48 rates. Traffic carried through these network interfaces is routed over the backplane to a central cross-connect point located on the XC card 440 or on redundant XC card 442.

In one embodiment, the XC card 440 and the redundant XC card 442 can switch any STS-1 payload to any low speed network interface card 420 or high speed network interface card 400. In a preferred embodiment, the XC card 440 and the redundant XC card 442 can switch any SONET VT1.5 virtual tributary located within a SONET STS-1 payload to any low speed interface card 420 or high speed interface card 400.

All cards are powered through local on-card switching power supplies. Redundant −48V power is provided through the backplane connectors, and is diode-ORed on each card. Staged pre-charge pins are provided to allow for well-controlled power initialization at card insertion.

Below the card cage proper is a plenum 460, which is used to provide uniform cooling air distribution to the cards above. The area in front of the plenum is used for fiber routing. A fan tray 470 is used to support cooling fans which circulate air above the plug-in cards and to air ramp 480.

B. Backplane design

In a preferred embodiment, network interface subsystem to cross-connect connections 150 are realized as parallel data bus on backplane 800 comprised of 32 signals representing 32 bit streams, supporting STS-192 (high speed) payloads. In this embodiment single-ended signals connected via end-terminated controlled impedance traces. Gunning Transistor Logic (GTL) is used on cross-connect unit 120 and on network interfaces 202 to accommodate a data rate of 311.04 MHz. In this embodiment, no clock is carried over the backplane. Clock recovery is performed at the receiving end by monitoring data transitions using clock recovery techniques known by those skilled in the art.

In an alternate embodiment only a subset of network interface subsystem to cross-connect connections 150 support STS-192 payloads associated with high speed network interface subsystems 200, with the remainder supporting STS-48 (low speed) payloads associated with low speed network interface subsystems 220. Connections to low speed network interface subsystems 220 are created using a parallel data bus of 8 bits representing 8 signals carried on single-ended, connected via end-terminated, controlled-impedance traces. GTL logic is used at both the receiving and transmitting devices. Clock recovery is performed by monitoring data transitions.

In another embodiment high speed network interface subsystems 200 support STS-48 payloads using a parallel data bus comprising 16 bits plus sync (17 signals) operating at 155.5 MHz over single-ended, connected via end-terminated, controlled-impedance traces. GTL logic is used on the transmitting and receiving devices. Clock signals are transmitted using a differential clock using (Low Voltage Differential Signals) signals at 155.52 MHz, connected via end-terminated, controlled-impedance traces.

In this embodiment low speed network interface subsystems 220 support STS-12 payloads using a parallel data bus comprising 4 bits plus sync (5 signals) operating at 155.5 MHz transmitted over single-ended, connected via end-terminated, controlled-impedance traces. GTL logic is used on the transmitting and receiving devices. Clock signals are transmitted using a differential clock based on LVDS signals at 155.52 MHz, connected via end-terminated, controlled-impedance traces.

In a preferred embodiment the backplane is comprised of a 32 layer board which supports connections between inserted cards with electrical traces within the board. Groups of controlled impedance traces have matched lengths to create equal propagation delays. In a preferred embodiment a 75Ω trace impedance is used, although other controlled impedances including 50Ω, 100Ω, or higher impedance traces can be used. Connector pins are interspersed with ground signals to reduce coupling and crosstalk between signal lines.

In a preferred embodiment traces used to carry high speed signals are a controlled impedance and have a termination resistor which is equal to the transmission line (trace) impedance, and which serves as a pull-up resistor for the output transistor of the transmit device which is connected to the trace.

In addition to traces used to realize payload connections over high speed connections 230 and low speed connections 240, which form the network interface subsystem to cross-connect connections 150, traces are in place to realize the data plane network subsystem interface connections 160 and the system communication links 352.

In addition to the traces used to support card to card connections, traces exist in the backplane to support protection as illustrated in FIGS. 12A–12C. One advantage of the present invention is that by using controlled impedance traces on the backplane it is possible to utilize backplane traces for the transport of electrical signals from the network either directly or with an impedance conversion. In the present invention DS-3 signals which are unbalanced and require approximately a 75Ω impedance can be transmitted on the backplane, while DS-1 signals which are received on a 100Ω balanced transmission line are converted to a 75Ω unbalanced signal using a balun. The 75Ω unbalanced signal can be propagated directly on the backplane and converted back to a balanced signal for transmission on the network. This feature allows use of the backplane traces for a wide variety of purposes including protection switching and the interconnection of cards.

The backplane also supports the use of Backplane Interface Cards (BICs) which provide space for connectors including SMB, CHAMP connectors manufactured by Amphenol, or other coaxial or twisted wire pair connectors. The BIC interfaces to the backplane through pins and receiving holes on the backplane.

In a preferred embodiment, protection switching relay matrices are mounted on the interface cards which support electrical interfaces. In an alternate embodiment, protection switching relay matrices can be mounted on BICs.

C. Cross-connect subsystem

The XC 120 provides the switching fabric for the system. As the central switching element for the system, the XC 120 features low latency and fast switching to establish connections and perform time division switching at an STS-1 level between the XC 120 and the SONET network interface subsystem 130 and between the XC 120 and the data plane network interface subsystem 140.

Figure 5:
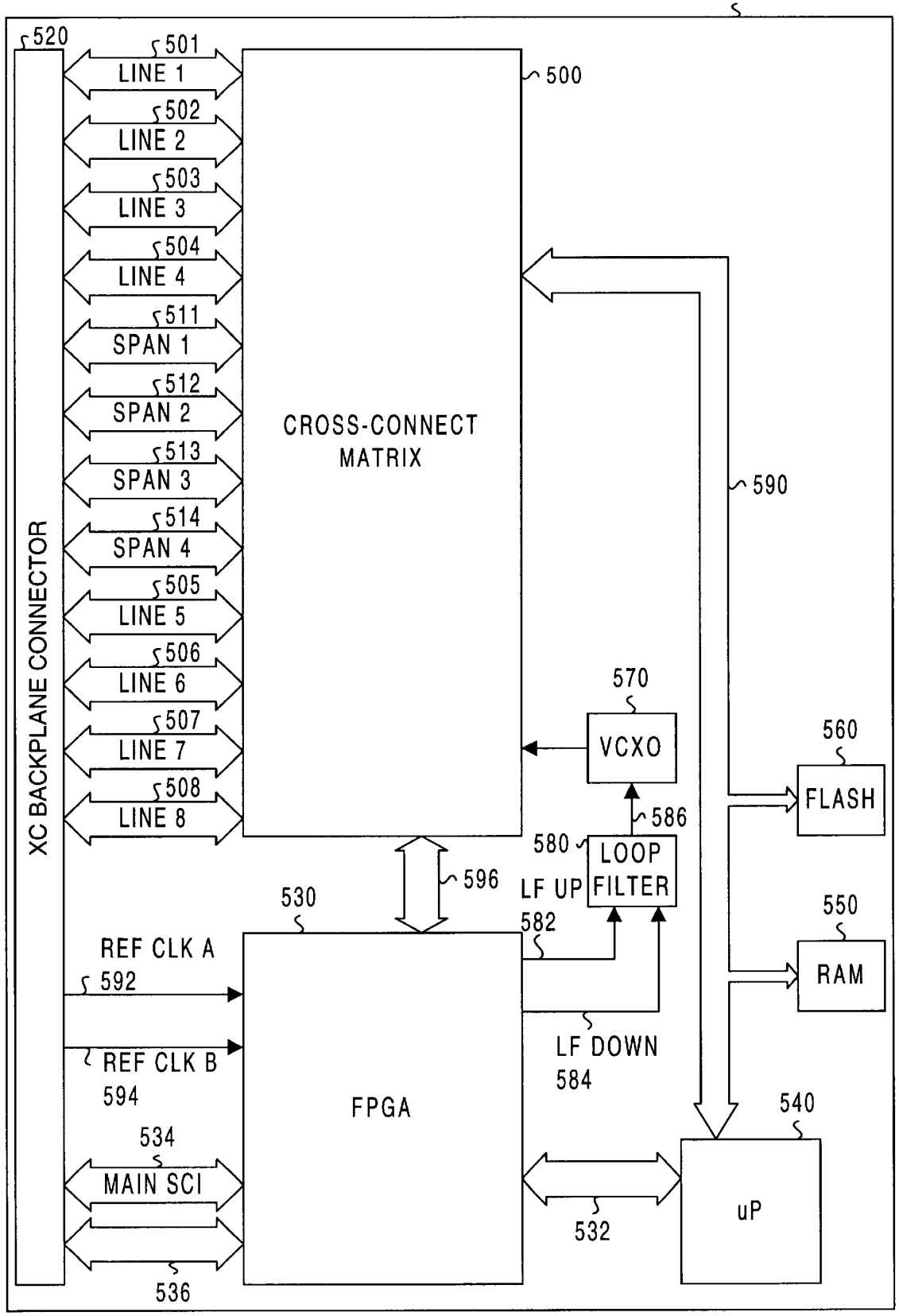
FIG. 5 illustrates a cross-connect (XC) card architecture.

FIG. 5 is a block diagram of XC card 440. As a plug-in card, connections to the XC card 440 occur through an XC backplane connector 520. On the board, the XC switch matrix 500 connects to XC backplane connector 520. Low speed line connections 501–504 and 505–508 connect a cross-connect matrix 500 to XC backplane connector 520. High speed line connections 511–514 connect cross-connect matrix 500 to backplane connector 520.

The XC switch matrix 500 also connects to the XC microprocessor 540, XC flash memory 560 and local random access memory (RAM) 550 over the microprocessor to XC matrix control bus 590. The XC microprocessor 540 connects to a XC card flash programmable gate array (FPGA) 530 over the microprocessor to XC card FPGA interface 532.

The XC card FPGA 530 connects to the XC switch matrix over the XC matrix to FPGA interface 596 and connects to the loop filter 580 providing a loop filter up control signal 582 and a loop filter down control signal 584. The loop filter 580 provides a frequency control signal 586 to the voltage controlled crystal oscillator (VCXO) 570. The XC card FPGA 530 receives reference clock A 592 and reference clock B 594 from reference clock sources through XC backplane connector 520.

XC card FPGA 530 supports control of cross-connect matrix 500 via signals received from TCC card 430 over the main system communication interface 534 or over the protect system communication interface 536. Functions performed by XC card FPGA include management of the SCL, and filtering of protection and notification information which is subsequently sent to and received from XC matrix 500. In a preferred embodiment the functions of XC card FPGA 530 are realized in an application specific integrated circuit (ASIC).

The XC card FPGA 530 also connects to the TCC card 430 over the main system communication interface 534, through the XC backplane connector 520 and the backplane 800, and to the redundant TCC card 432 over the redundant system communication interface 536 and through the XC backplane connector 520 and the backplane 800.

In a preferred embodiment the XC switch matrix 500 resident on the XC 440 is a full crosspoint, non-blocking, switch and supports broadcast switching. Designs for such switching matrices are well known to those skilled in the art. XC switch matrix 500 allows network operators to concentrate, groom, or hairpin network traffic from one interface card to another without limit on card location within the equipment. An STS-1 on any of the input ports may be mapped to an STS-1 slot on any of the output ports.

In one embodiment, the XC switch matrix 500 can switch any STS-1 payload coming over a low speed line connection 501–508 or over a high speed line connection 511–514 to any low speed interface card 420 or high speed interface card 400.

In a preferred embodiment, the XC switch matrix 500 can switch any SONET VT1.5 virtual tributary located within a SONET STS-1 payload coming over a low speed line connection 501–508 or over a high speed line connection 511–514 to any low speed interface card 420 or high speed interface card 400.

Provisioning of the switch matrix 500 is accomplished via information which is relayed from the TCC card 430 through the main serial communication interface 534 or which is relayed from the redundant TCC card 432 through the protect serial communication interface 536. This information is monitored by the XC card 440 and used to establish and tear down connections. Main serial communication interface 534 and protect serial communication interface 536 represent the board level connections which correspond to system communication link 352.

D. Timing communications and control subsystem

The timing communications and control card (TCC) 430 performs system initialization, provisioning, alarm reporting, maintenance, diagnostics, IP address detection/resolution, SONET DCC termination, and system fault detection for the system. The TCC also ensures the system maintains Bellcore timing requirements.

Figure 6:
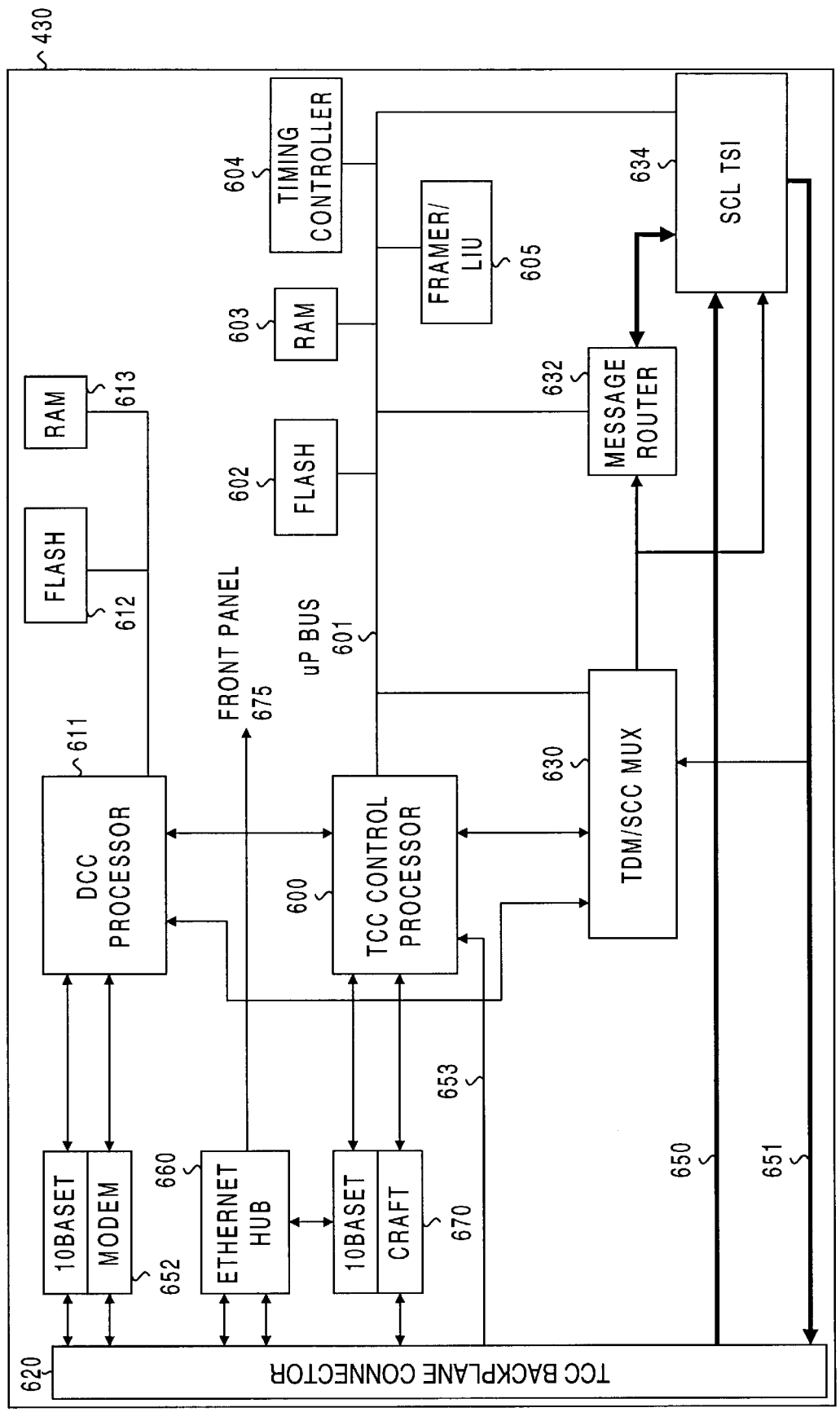
FIG. 6 illustrates a Timing, Communications, and Control (TCC) card architecture.

FIG. 6 is a block diagram of the TCC card 430. Connections to other system cards 400 420 432 440 442 450 are made through a TCC backplane connector 620 and via backplane 800. The serial communication link (SCL) termination link 640 brings SCL 352 from each low speed network interface card 420 and each high speed network interface card 400 to the SCL time slot interchanger (TSI) 634. The SCL TSI 634 also provides outgoing communications, timing, and control signals to the XC card 440 and the redundant XC card 442 and to the time division multiplexer/serial communications controller (TDM/SCC) 630.

The TDM/SCC 630 is a multiplexer and cell bus processor providing a TDM signal to the SCL TSI 634 and to the message router 632. The message router 632 also receives cells from the SCL TSI 634 and is a cell switch for all the interface cards. The message router 632, TCC flash memory 602, random access memory 603, timing controller 604, framer line interface unit (LIU) 605, SCL TSI 634 and TDM/SCC 630 all receive control signals from the TCC control processor 600 over the microprocessor bus 601. The TCC control processor 600 also has cell based connection to the TDM/SCC 630, a connection to a 10BaseT Ethernet/craft interface module 670 which connects to the TCC backplane connector 620, and a control and communication connection to the DCC processor 611. A redundant TCC connection 653 is provided and connects the TCC control processor 600 on the TCC card 430 to a serial port on the TCC control processor 600 on the redundant TCC card 432. The DCC processor 611 has a bi-directional connection to the TDM/SCC 630, connection to local DCC processor flash memory 612 and random access memory 613, and a connection to a 10BaseT Ethernet/modem interface module 652 which connects to the TCC backplane connector 620.

An Ethernet hub 660 connects to the backplane connector 620, the 10BaseT and craft interface module 670, and has an interface on the front panel 675.

The TCC card 430 supports multichannel high-level data-link control (HDLC) processing for Data Communication Channels (DCC). Up to 48 DCCs may be routed over the serial communication link (SCL) 352 and terminated at the TCC card 430. Ten DCCs are selected and processed on TCC card 430. This facilitates remote system management interfaces.

The TCC card 430 also originates and terminates a cell bus carried in SCL 352. The cell bus supports links between any two cards in the system for peer-to-peer communication. Peer-to-peer communication speeds protection switching for redundant cards. The system database, IP address, and system software are stored in TCC non-volatile flash memory 602 and 612, allowing quick recovery in the event of a power or card failure.

The TCC card 430 performs system timing functions for the system. The TCC card 430 monitors the recovered clocks from each low speed interface card 420 and from each high speed interface card 400, and two DS1 (BITS) interfaces for frequency accuracy. One of the recovered clocks, one of the BITS, or an internal Stratum 3 reference is selected as the system timing reference. Any of the clock inputs may be provisioned as a primary or secondary timing source. A slow reference tracking loop allows the TCC card 430 to synchronize to the recovered clock, providing holdover if the reference is lost.

E. System Communications Link (SCL)

In a preferred embodiment there are several types of internal communications paths used to transport timing, communications, and control signals. The combined signals are referred to as the system communications link (SCL) 352. SCLs 352 connect interface subsystems 301–304, 309, 311–314, 315 with TCC unit 300, as shown in FIG. 3. In a preferred. embodiment SCLs 352 are carried on point-to-point connections with low latency and guaranteed bandwidth in a byte oriented manner.

Figure 7:
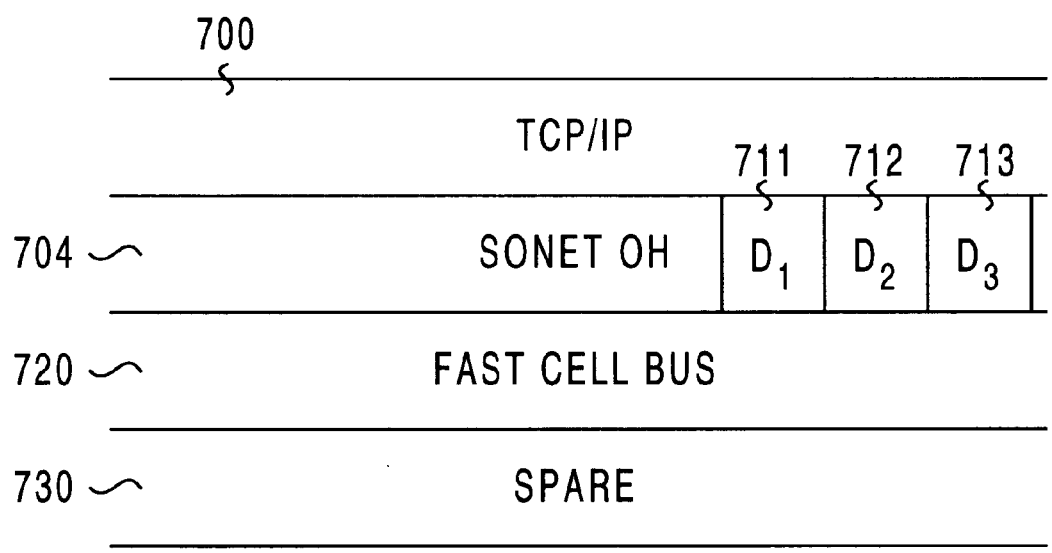
FIG. 7 illustrates the System Communications Link (SCL) architecture.

Referring to FIG. 7, the SCL includes SONET overhead bytes located within the SONET overhead channel 704, such as the data communication channel (DCC) bytes D1 711, D2 712, and D3 713. SONET overhead bytes can also include orderwire, and K1 and K2 automatic protection switch (APS) bytes. Format for SONET overhead is described in GR-253 and is understood by those skilled in the art.

SCL 352 supports intercard communications for configuration, performance monitoring, and other general purposes. In a preferred embodiment SCL 352 combines both byte-oriented time division multiplexed (TDM) and cell-switched capability within one physical link.

In a preferred embodiment, the physical link consists of a 19.44 MHz differential LVDS clock, a frame synchronization signal, an enable signal, a transmit data signal, and a receive data signal. Although the clock frequency is 19.44 MHz, through the use of the enable signal, the data rate is reduced to 16.384 Mb/s. Referring to FIG. 7, the SCL is subdivided into four bit-interleaved 4.096 Mb/s channels; a TDM TCP/IP channel 700, a TDM SONET overhead channel 704, a bit-interleaved fast cell bus channel 720, and a TDM spare channel 730. Each channel is further divided into 64 eight-bit timeslots, with a 125 $\mu$s frame rate. The fast cell bus 720 is used to carry internal cell-switched intercard communications.

In a preferred embodiment SCLs 352 are realized as physical point-to-point connections on backplane 800 between each high-speed network interface card 400 and each main TCC card 430 and redundant TCC card 432, and between each low speed network interface card 420 and each main TCC card 430 and redundant TCC card 432. Every card connects to both TCC card 430 and redundant TCC card 432. In a preferred embodiment the SCL 352 connected to the currently working TCC is used to carry active data.

The SCL 352 from each high-speed network interface card 400 or from each low speed network interface card 420 is terminated on the TCC card 430, where each SCL 352 is split into the three 64-byte TDM channels 700, 704, 730, and the 64 byte fast cell bus channel 720. The TDM channels 700, 704, and 730 are connected to the SCL TSI 634, where, working in conjunction with the TDM/SCC 630, the individual bytes within each channel are reassembled onto the SCL output channel 651. The SCL TSI 634 is capable of arbitrary timeslot rearrangement, and is also able to place programmed byte values in a given output timeslot. In this manner, bytes (such as SONET overhead bytes) are collected from the various high speed network interface cards 400 and from the various low speed network interface cards 420 and are sent to their destination cards.

The cell switched channel 720 of the SCL 352 is sent to the cell-switch message router 632, which routes each received cell to the destination encoded in the cell header.

The SCL also provides a system watchdog or tripwire function through dedicated timeslots and pattern generation and detection hardware at each end of the links.

F. Data timing and alignment

In order to permit the transport of high speed STS-48 and STS-192 payloads from low speed interface cards 420 and high speed interface cards 400 to cross connect card 440 and redundant cross connect card 442, synchronization signals are sent from the cross connect card 442, or in the case of a failed cross connect card 440 from the redundant cross connect card 442, to low speed interface cards 420 and high speed interface cards 400.

In a preferred embodiment pre-alignment of the signals is performed on the low speed interface cards 420 and high speed interface cards 400. The pre-alignment of the signals is accomplished through the use of a programmable offset generator which is used to account for the delay between the interface cards and the cross connect. Referring to FIG. 1, this is an offset implemented in SONET plane network interface subsystems 130 and data plane network interface subsystems 140 to facilitate cross connection of high data rate streams at cross connect 120.

Figure 8:
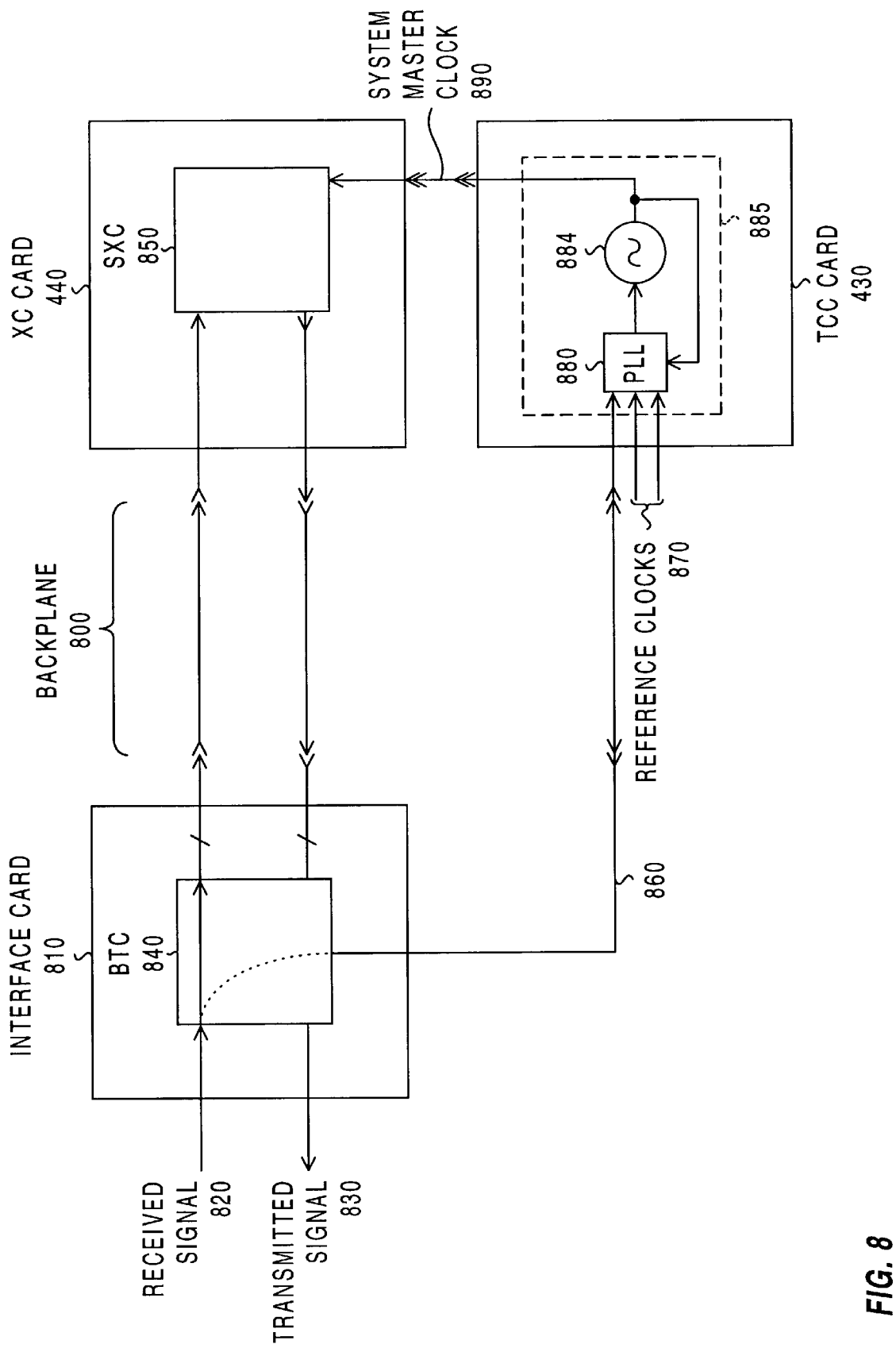
FIG. 8 illustrates system timing flows.

FIG. 8 illustrates the system connections between a interface card 810 which represents any card used to realize a SONET plane network interface subsystem 130 or a data plane network interface subsystem 150 and XC card 440. Interface card 810 contains a Bridging Transmission Convergence Application Specific Integrated Circuit (BTC ASIC) 840, and XC card 440 contains a SONET cross connect Application Specific Integrated Circuit (SXC ASIC). TCC card 430 is represented in FIG. 8 and contains a PLL 880 and a voltage controlled oscillator 884.

In a preferred embodiment SXC ASIC 850 supports STS-192/48/12 interfaces using ports operating at 311MHz using single-ended Gunning Transistor Logic (GTL) signals, and connects across backplane 800 to BTC ASIC 840. In a preferred embodiment, SXC ASCI 850 can be controlled by a microprocessor, an example of which is the Motorola 860 class of processors. Alternate processors can be used and are known to those skilled in the art.

BTC ASIC 840 interfaces to backplane 800 at 311 MHz as well as at 155 MHz, to support interface cards 810 which are of the classes of high speed network interface subsystems 200 or low speed network interface subsystems 220. In a preferred embodiment the BTC ASCI 840 contains an interface port to a microprocessor, examples of which are the Motorola 850 and 860 classes of processors.

As illustrated in FIG. 8, a timing reference clock 860 originating as part of a received signal 820 is extracted in BTC ASIC 840 and flows to the TCC card 430. At the TCC card 430 the timing reference clock passed through a TCC timing tracking loop 885 formed by PLL 880 and voltage controlled oscillator 884 resulting in a system master clock 890.

The system master clock 890 is transmitted to SXC ASIC 850 on the cross-connect card 440, to the interface card 810 over a backplane 800, and out on the transmitted signal 830. The format of the signals flowing between the BTC ASIC 840 and the SXC ASIC 850 includes parallel data lines, a sync signal, and a clock signal.

Figure 9:
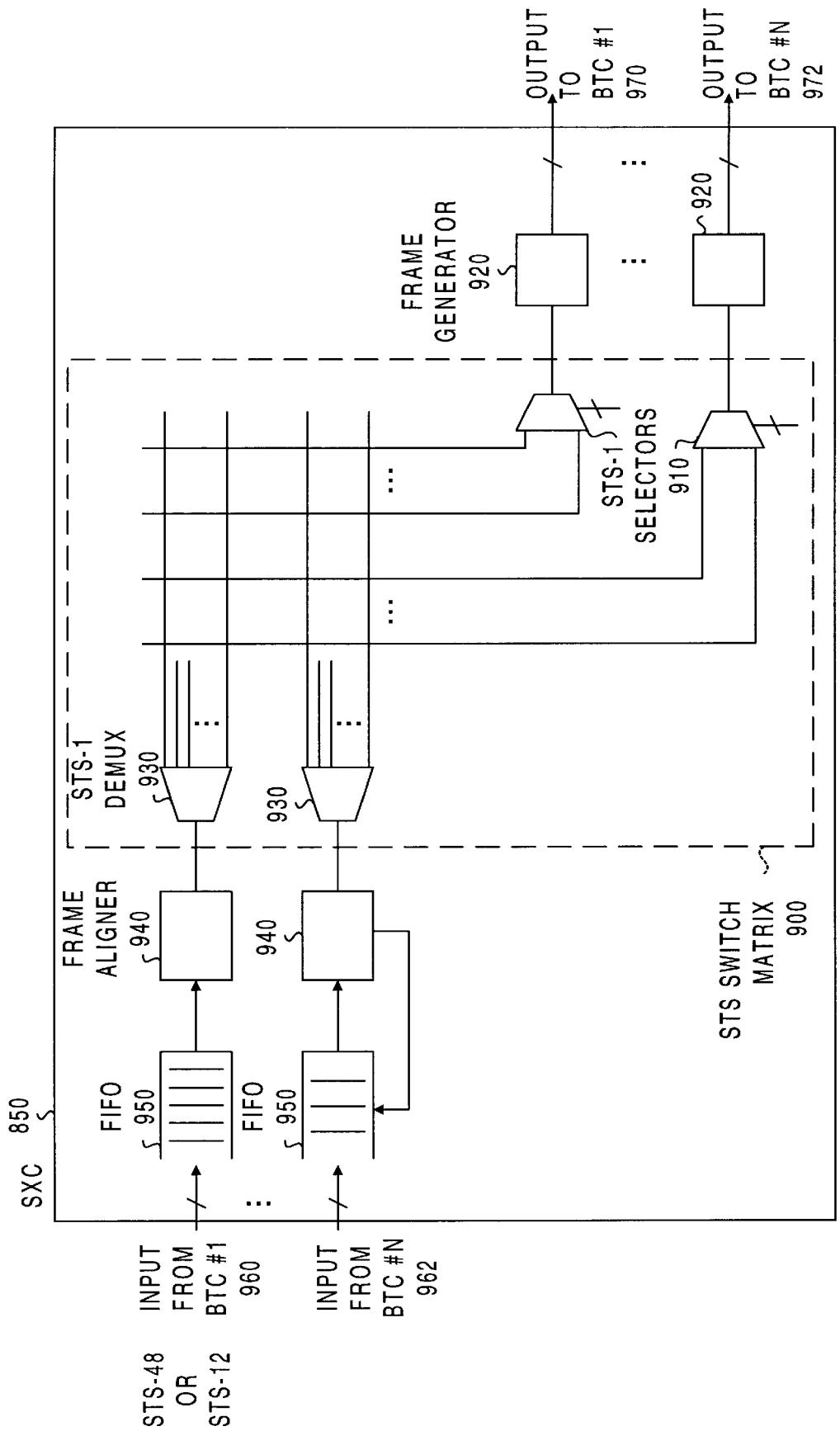
FIG. 9 illustrates the architecture for a cross-connect (XCC) application specific integrated circuit (ASIC)

FIG. 9 illustrates the structure of SXC ASIC 850. Inputs from BTC #1 960 through BTC #N 962 on several interface cards 810 are received at SXC ASIC 850. Each input flows through a FIFO 950, the depth of which can be controlled by a subsequent frame aligner 940. The frame aligner 940/FIFO 950 combination is used to delay each of the incoming SONET frames (from the BTC ASICS 840) such that upon arrival at a STS switch matrix 900 all STS signals are frame-aligned. This allows the STS selectors 910 and frame generators 920 to assemble a SONET frame at each of the outputs easily and with no extra buffering. The assembled SONET frame is constructed of the STS-1 signals which have been demultiplexed by STS-1 demux 930-and selected by STS-1 selectors 910. FIFO 950 is needed to accommodate the delays between the XC card 440 and interface card 810 (including propagation delays arising from backplane 900, connector propagation delays, and ASIC I/O and internal logic delays). In an alternate embodiment, STS switch matrix 900 is replaced with a VT 1.5 switch matrix to allow cross-connection at the VT1.5 level of the SONET STS-1 frame. Other granularity cross connect fabrics can be used to permit cross-connection at other standard or non-standard data rates.

Figure 10:
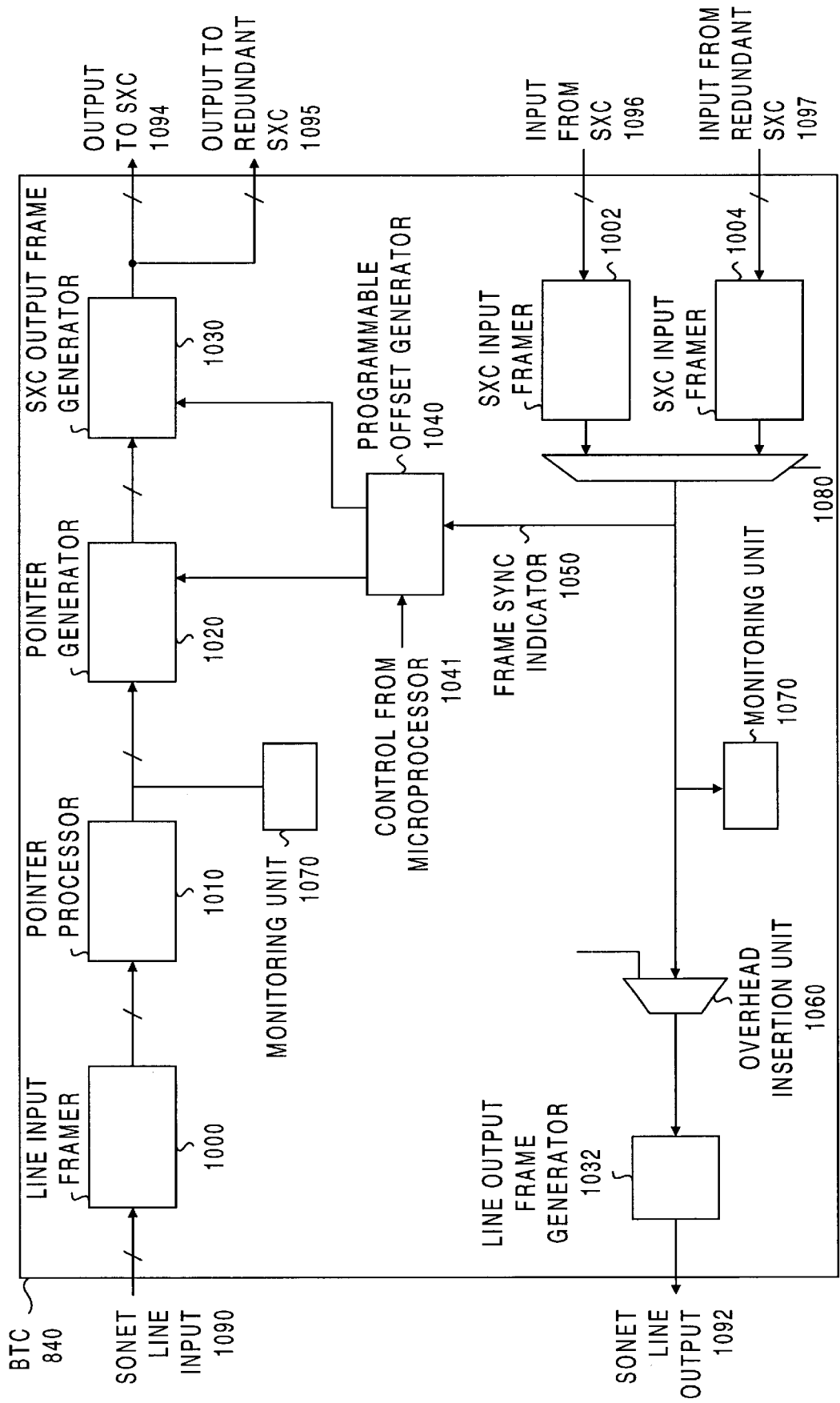
FIG. 10 illustrates the architecture for a bridging transmission convergence (BTC) application specific integrated circuit (ASIC)

FIG. 10 illustrates the structure of BTC ASIC 840, which is resident on high speed network interface card 400, low speed interface card 420, or any other interface card which comprises the SONET plane network interface subsystem 130 or data plane network interface subsystem 140. The SONET line input 1090 is received by line input framer 1000 and has an arbitrary input frame alignment, and may have small frequency errors as well, which will create a shifting frame alignment. A receive pointer processor 1010 is used to identify the alignment of the individual STS1's within the received frame, and a pointer generator 1020 and frame generator 1030 are used to create a new SONET frame that is aligned to meet the requirements of the SXC ASIC 850. This alignment is controlled by the frame alignment of the SONET frame received via the backplane 800 from SXC ASIC 850, and by a programmable offset generator 1040 that will cause the frame generator 1030 to send the frame, advanced by a controlled amount from the alignment of the frame from the SXC ASIC 850. The amount of offset is selected based on the predetermined system delays, the depth of the FIFO's within the SXC ASIC 850, and the additional data path delays within the SXC ASIC. In addition, the controllable offset is used to allow for different cross-connect designs that have different delay characteristics. Output from frame generator 1030 appears at an output to SXC 1094 and an output to redundant SXC 1095.

Referring to FIG. 10 BTC ASIC 840 has an input from SXC 1096 and an input from redundant SXC 1097. SXC input framers 1004 are used to frame the received signal, and selector 1080 is used to select one of the signals. A frame sync indicator 1050 is sent to the programmable offset generator 1040, which in conjunction with control signals 1041 from a microprocessor resident on high speed network interface card 400 or low speed network interface card 420.

The signal being generated for transmission in BTC ASIC 840 is sent from the selector 1080 to an overhead insertion unit 1060 and line output frame generator 1032 to form a SONET line output 1092.

Monitoring units 170 are used to monitor framed signals and to determine erroneous states which should be reported to TCC card 430.

G. Software architecture

Figure 11:
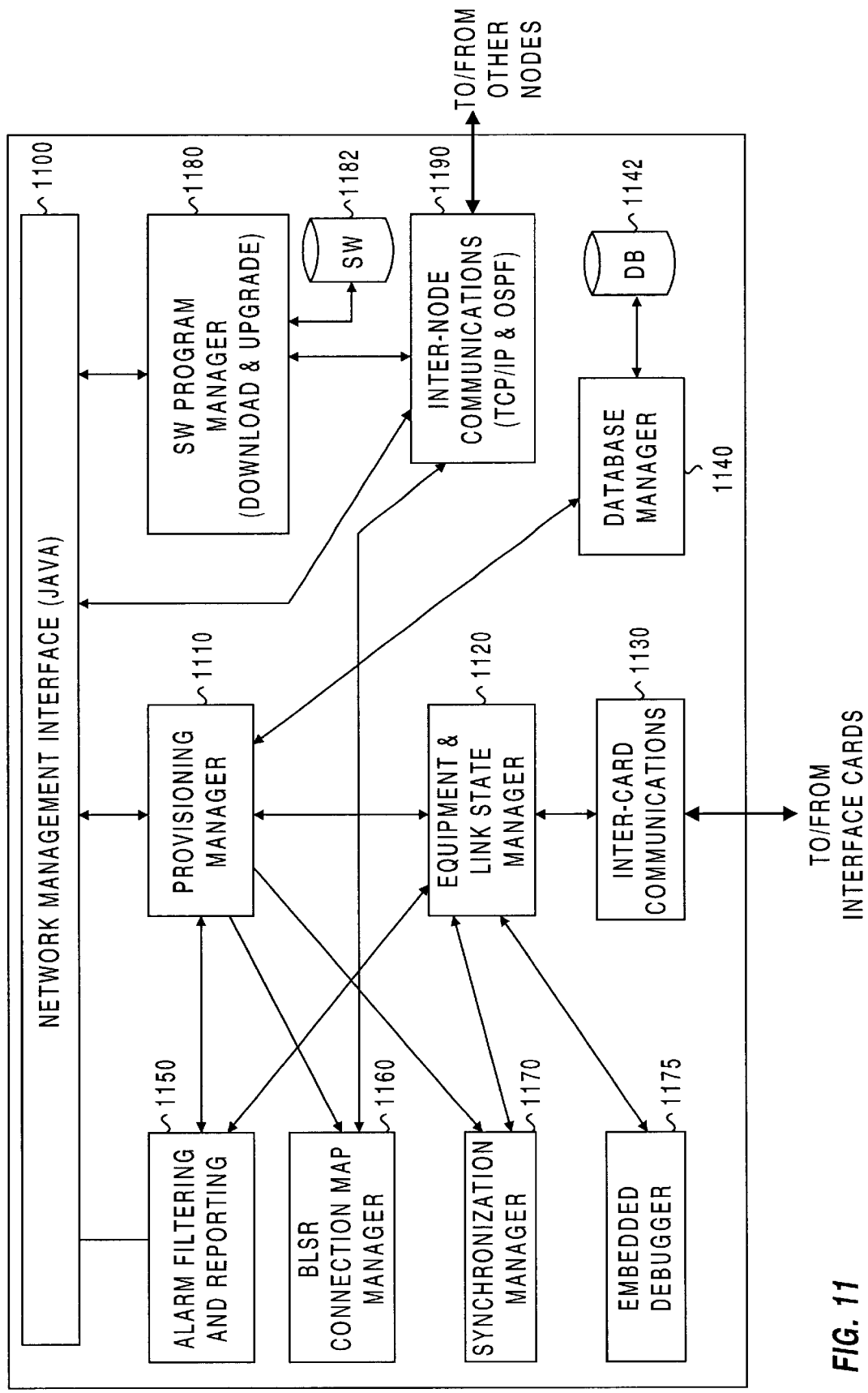
FIG. 11 illustrates a software architecture for the present invention.

FIG. 11 illustrates the software architecture of the TCC unit 300 in a preferred embodiment. In a preferred embodiment the software is realized using the JAVA and C programming languages running on the operating system sold under the trademark VXWORKS by the Wind River Systems Corporation. In a preferred embodiment the low-level software which communicates between boards in the system is written in C, but management software performs as a HTML server, and is written in C and Java. In a preferred embodiment the software runs on an MPC860 processor.

As illustrated in FIG. 11, a network management interface 1100 is present and serves as the interface to the rest of the software. In a preferred embodiment network management interface 1100 is realized in the JAVA programming language, and allows the use of any browser in a network element running a TCP/IP stack to address the system.

A provisioning manager 1110 is present and is responsible for managing the provisioning database for the system. The provisioning manager 1110 interfaces with subordinate cards via an equipment & link state manager 1120 and to the management software via network management interface 1100.

The equipment & link state manager 1120 addresses network interface cards via an inter-card communications module 1130, and is the central point of communications between the TCC card and the subordinate cards, which can be considered to be cards forming SONET plane network interface subsystems 130, data plane interface subsystems 140, and cross connect 120. The equipment & link state manager 1120 notifies other components on the TCC when a slave card needs service, and blocks information being sent to a slave card that is in the process of reading its software image from a shelf controller. In addition, the equipment & link state manager 1120 maintains information about the state of each slot, card and communications link, and in a preferred embodiment acts as the single authority on the state of each component in the system. The equipment & link state manager 1120 on each non facility protected card is responsible for initiating an equipment protection switch when a partial or full failure is detected on a card. In a preferred embodiment, a card presence/alive message is transmitted over SCL 352 and it transported to peer cards, subordinate cards, TCC, and the cross connect. The equipment & link state manager is responsible for monitoring this link and initiating the proper action when a failure is detected.

Provisioning manager 1140 also talks with database manager 1140 which maintains a database 1142 of equipment and service related information.

The software also supports alarm filtering and reporting through an alarm filtering and reporting module 1150. The alarm filtering and reporting module 1150 confirms that a failure condition exists for a pre-programmed amount of time and can report alarms which have been filtered. Provisioning manager 1110 is responsible for programming of times and filters in the alarm filtering and reporting module 1150.

A BLSR connection map manager 1160 maintains information related to ring configurations, and in particular maintains a record of the K1/K2 bytes of the SONET line overhead using in ring networks.

A synchronization manager 1170 provides for the provisioning and monitoring of an internal stratum 3 clock reference, the provisioning and monitoring of a building integrated timing supply (BITS) input, provisioning and control of the DSX-1 formatted BITS output, and selection of the timing reference for the system. In addition, synchronization manager 1170 selects the timing reference for the BITS output, processes and acts upon synchronization status messages, and controls synchronization switching on synchronization reference changes.

An embedded debugger 1175 provides the ability to detect and repair software errors as determined in conjunction with equipment & link state manager 1120.

A software program manager 1180 supports downloading and upgrading to new system software which is stored in software storage 1182. Specifically software program manager 1180 supports the receiving of new software loads, access to a flash memory file system, upgrading of the boot image, and access to software images when subordinate cards boot.

An inter-node communications module 1190 supports communications between the system and other nodes, using both TCP/IP and open shorted path first (OSPF) protocols.

II. Redundancy and Protection

In a preferred embodiment the system employs an individual card protection architecture, where a protected card that fails is replaced by the protection card. This contrasts with a bank-switching protection architecture, where an entire "bank" of cards switches should any member of the bank fail. The individual card protection method offers a significant advantage in flexibility, in particular where a mixture of protected and non-protected services are provided from the same shelf.

In a preferred embodiment the protected common equipment cards include XC card 440, and TCC card 430.

Backplane 800 supports connections such that each of the 12 network interface cards 810 has fully duplicated connections to XC card 430 and redundant XC card 432 and to the TCC card 430 and redundant TCC card 432. A card that is at the receiving end of one of these connections uses hardware detection to monitor SCL 352 for activity and valid data patterns. Should the active link fail, the processor on the receiving board is notified by the monitoring hardware. Link selection is performed by either local board firmware or by automatic hardware switching.

The electrical interfaces on the network interface cards 810 allow both 1:1 and 1:N equipment protection by way of interconnections between neighboring cards of a protection group. Relays on the network interface cards 810 are used to connect the active card to the appropriate electrical interface, thus supporting protection without requiring manual intervention and rearrangement of external cabled connections.

Referring to FIG. 12A, 1:5 protection for a left group 1200 and right group 1210 is illustrated. Network interface connections 1205 are illustrated as well as backplane protection traces 1208. The backplane protection traces 1208 in backplane 800 provide connectivity between each card and an outer card, via pin connections on the card backplane connectors to pins on the backplane connectors. Backplane pins are connected to other backplane pins via traces in the multilayer backplane 800. Connections are also provided between each working card and the protect card. Right group 1210 illustrates the mirror image backplane protection traces 1208 which support right group 1210.

In the configuration illustrated in FIG. 12A, failure on a working card is accommodated by the routing of traffic to an adjacent (away from the center) card, or to the protect card.

In a preferred embodiment the protect card can be used to carry traffic, but that traffic may be abandoned in the event of a failure on a working card.

FIG. 12B illustrates the case for 1:1 protection in left group 1200 in which each working card has an adjacent protect card. When used in the 1:1 configuration there are unused backplane traces 1220, represented as dotted lines in FIG. 12B. Although there are unused backplane traces 1220, these traces do not need to be removed from backplane 800. TCC unit 300 which is realized as TCC card 430 can be programmed to configure the system for 1:1 protection, leaving certain backplane traces unused for that particular configuration.

Right group protection using the 1:1 configuration illustrated in FIG. 12B can be accomplished by creating the mirror image of the traces shown in FIG. 12B on the right side of backplane 800.

FIG. 12C illustrates a combined 1:2, 1:1 and unprotected card configuration for left group 1200. This configuration can be accomplished using the same backplane traces that are used for 1:5 and 1:1 protection schemes. As with the other protect schemes, TCC card 430 controls the configuration.

An advantage of the present invention is that cards can be configured via software and the protection schemes can be varied without the use of jumper cables on the backplane or rearrangement of cards in the shelf.

III. System Transport Configurations

The present system can be utilized in a variety of configurations supporting transport of data on MAN/LAN, interLATA and interexchange networks. Because the system can establish cross connections between any interface cards and can use a data plane for local switching, a wide variety of transport configurations can be supported, including configurations in which a virtual LAN is created in the data plane, and access to the SONET plane is granted for transport to other nodes.

Figure 13:
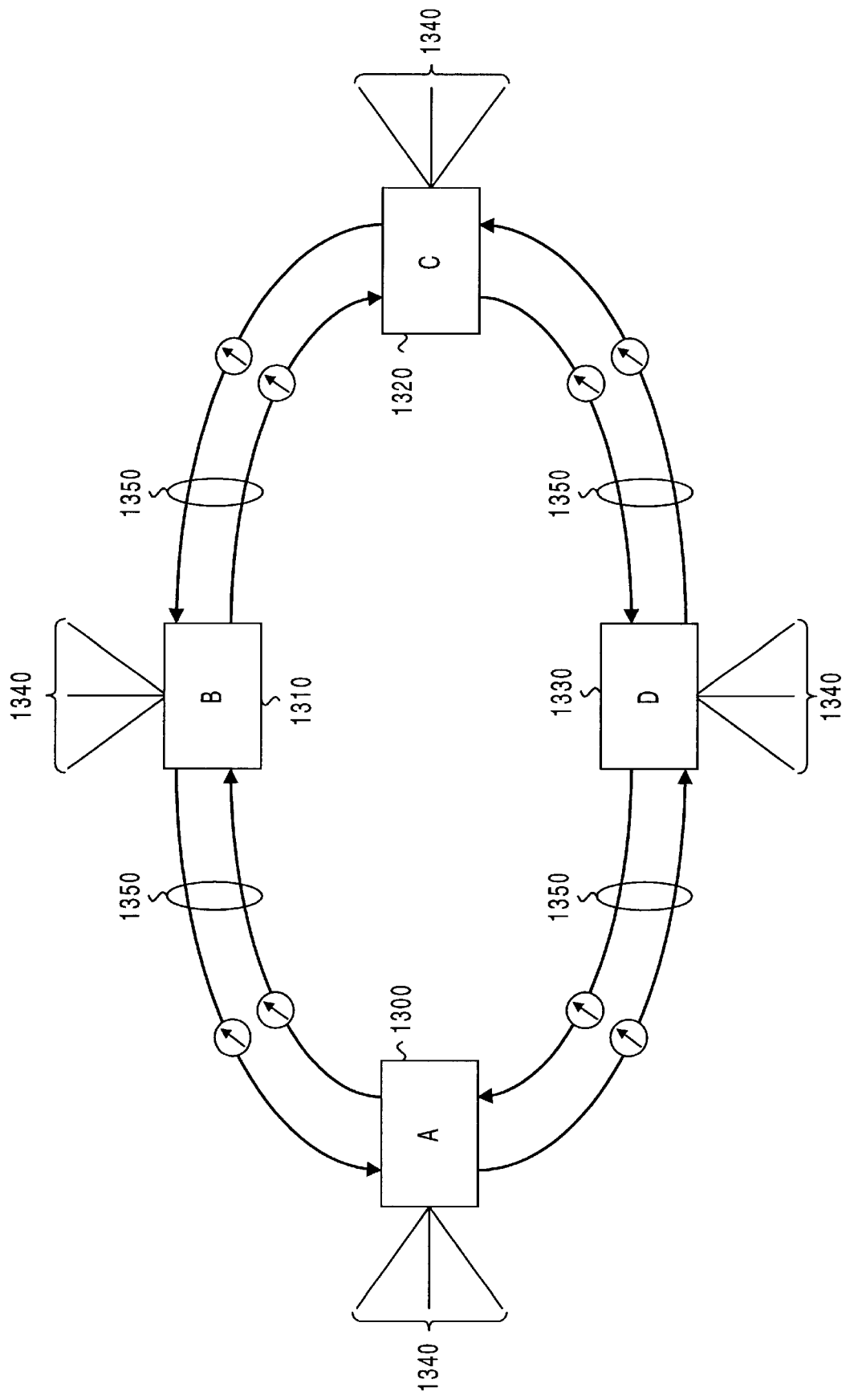
FIG. 13 illustrates a two-fiber Bidirectional Line-Switched Ring (BLSR) ring configuration.

FIG. 13 illustrates prior art for an optical ring architecture having four SONET network elements A 1300, B 1310, C 1320, and D 1330 with optical fiber spans 1350 creating the ring structure. In this configuration the SONET network elements A 1300, B 1310, C 1320, and D 1330 can be SONET line termination equipment (LTE) or add-drop multiplexers (ADMs). The fiber spans may be composed of one or more unidirectional or bi-directional fibers or optical cables. Input signals 1340 are typically electrical signals which are then routed by SONET network elements over the optical fiber ring 1350 to the appropriate destination SONET network element.

Figure 14A:
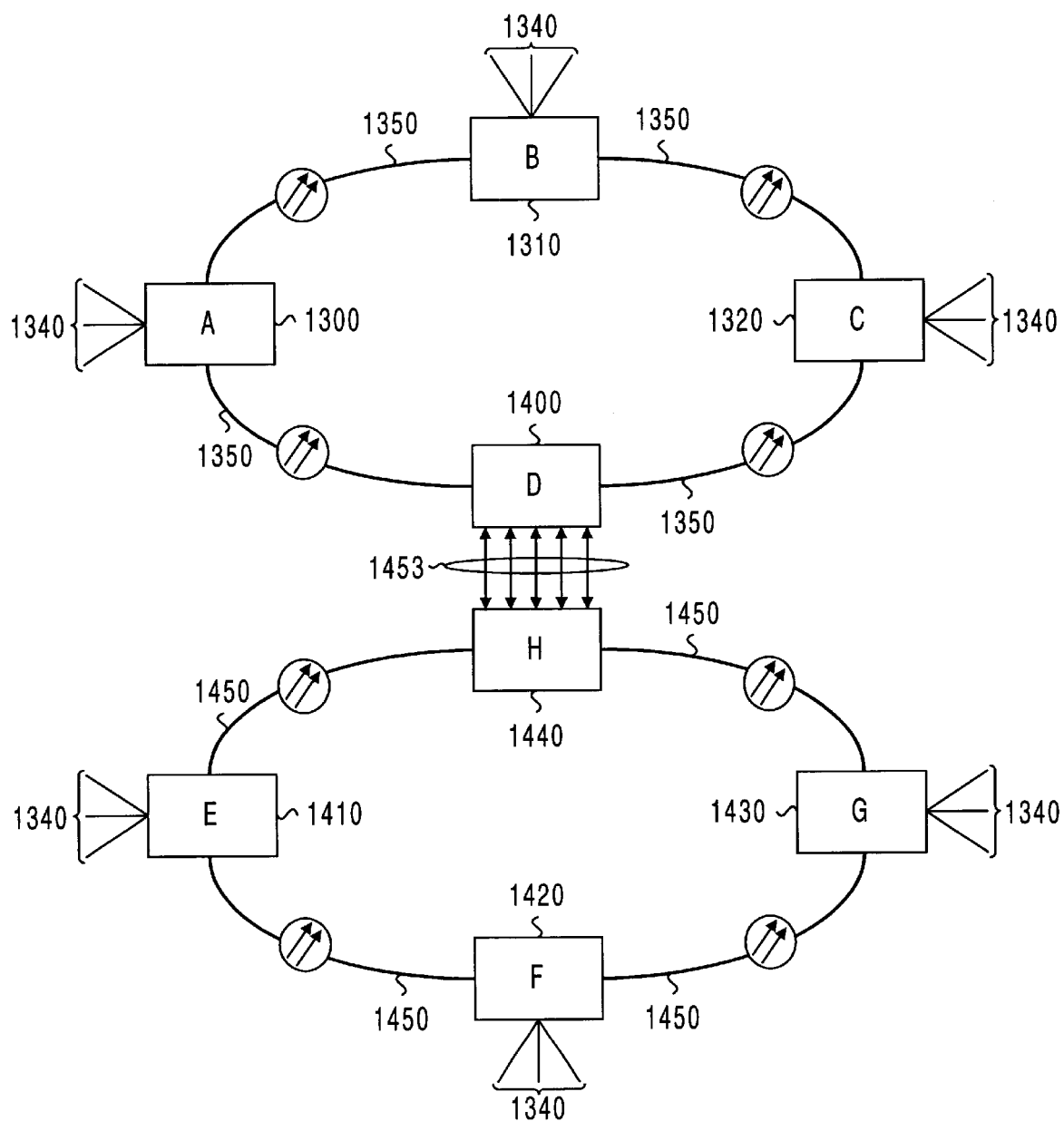
FIGS. 14A and 14B illustrate a dual ring configuration with a standard interface between add-drop equipment and with both rings supported from a single cross connect respectively.

FIG. 14A illustrates a multi-ring network commonly found in the telecommunications industry. In FIG. 14A, a first ring is composed of four SONET network elements A 1300, B 1310, C 1320, and D 1400 interconnected by optical fiber links 1350. A second ring composed of another four SONET network elements E 1410, F 1420, G 1430 and H 1440 interconnected by optical fiber links 1450. For signals originating on one ring but having a destination on the other ring, a back-to-back interconnection of SONET network elements is required. This back-to-back configuration is illustrated by node-to-node connection 1453 between SONET network element D 1400 and SONET network element H 1440. Present equipment supports a single ring in an individual add-drop multiplexer such as those represented by SONET network elements D 1400 and H 1440.

Figure 14B:
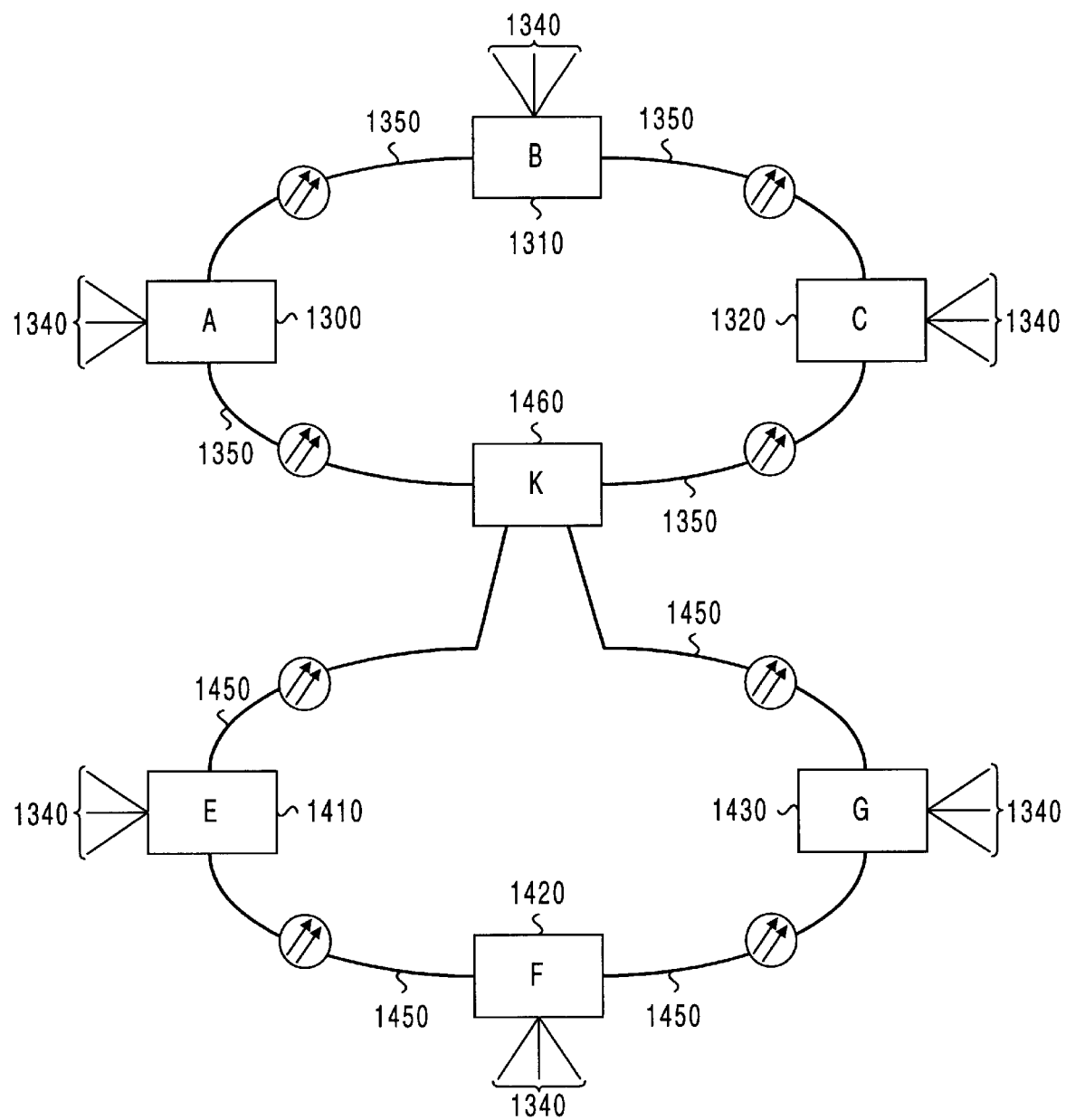

FIG. 14B illustrates a multi-ring network that utilizes a SONET network element K 1460 having the capability of a flexible cross-connect to support multiple optical rings, as can be realized using the present invention. As shown in FIG. 14B, one ring is composed of SONET network elements A 1300, B 1310, C 1320, and K 1460 that are interconnected with optical fiber segments 1350. A second ring that is connected to the first ring by the sharing of SONET network element K 1460, is composed of SONET network elements E 1410, F 1420, G 1430, and K 1460 interconnected by optical fiber segments 1450. This configuration eliminates the need for the back-to-back configuration of SONET network elements D 1400 and H 1440 while maintaining the full capability and functionality of the configuration.

Figure 15:
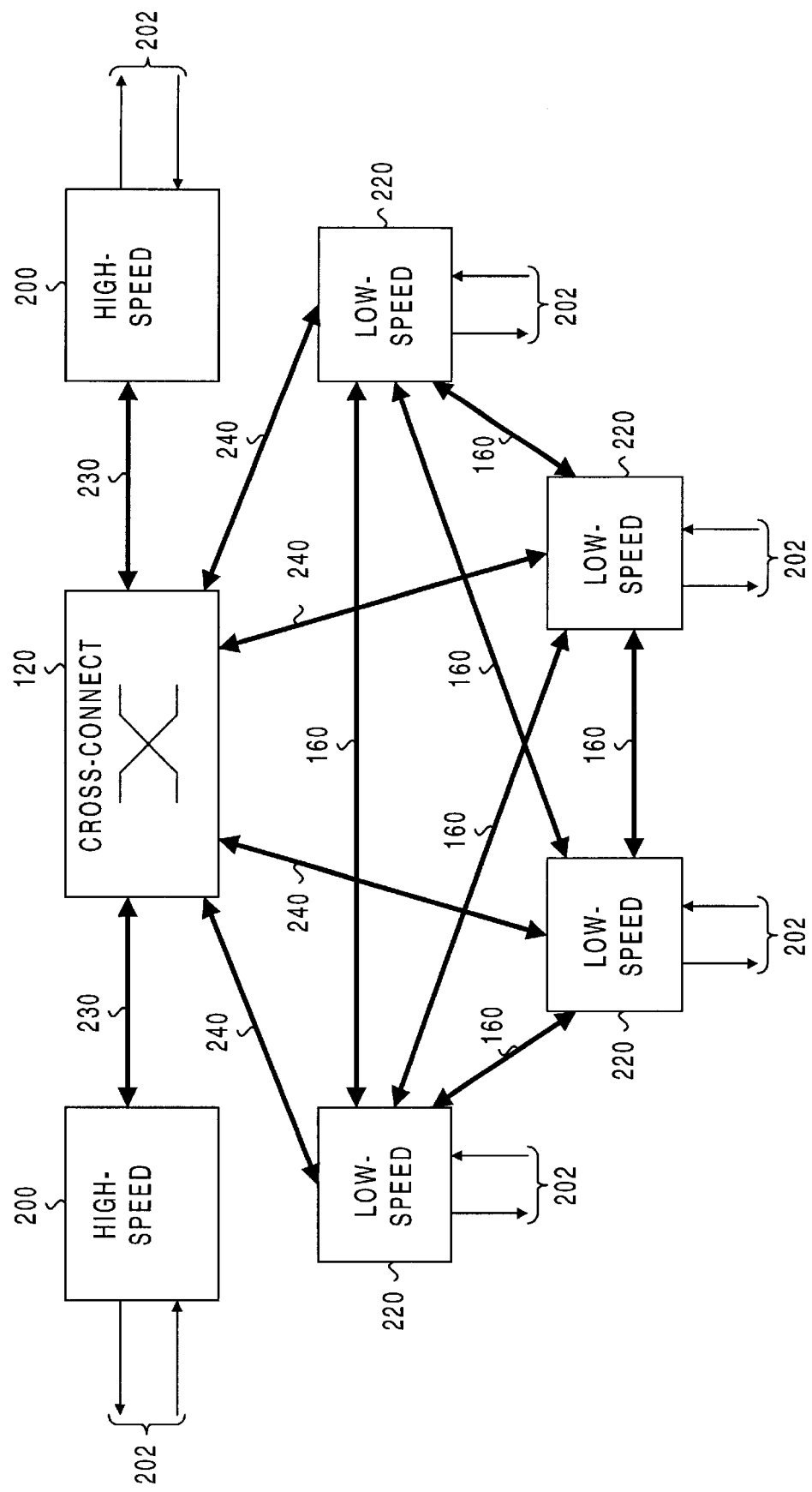
FIG. 15 illustrates a mesh network created between low speed network interface cards.

FIG. 15 illustrates a mesh network created by connections between low speed network interface subsystems 220. In the present invention the mesh network can be realized in data plane 110 without the use of cross connect 120, while simultaneously accessing cross connect 120 for connectivity to SONET plane 100.

As illustrated in FIG. 15, the group of low speed network interface subsystems 220 are-interconnected with point-to-point connections 160 between each of the low speed network interface subsystems 220. In a preferred embodiment, these connections 160 are 1 and 3 Gb/s point-to-point links between network interface cards in the data plane 110.

FIG. 15 also illustrates how centralized XC 120 connects to high speed network interface subsystems over high speed point-to-point interconnections 230, and connects to low speed network interface subsystems 220 over low speed point-to-point interconnections 240.

Figure 16B:
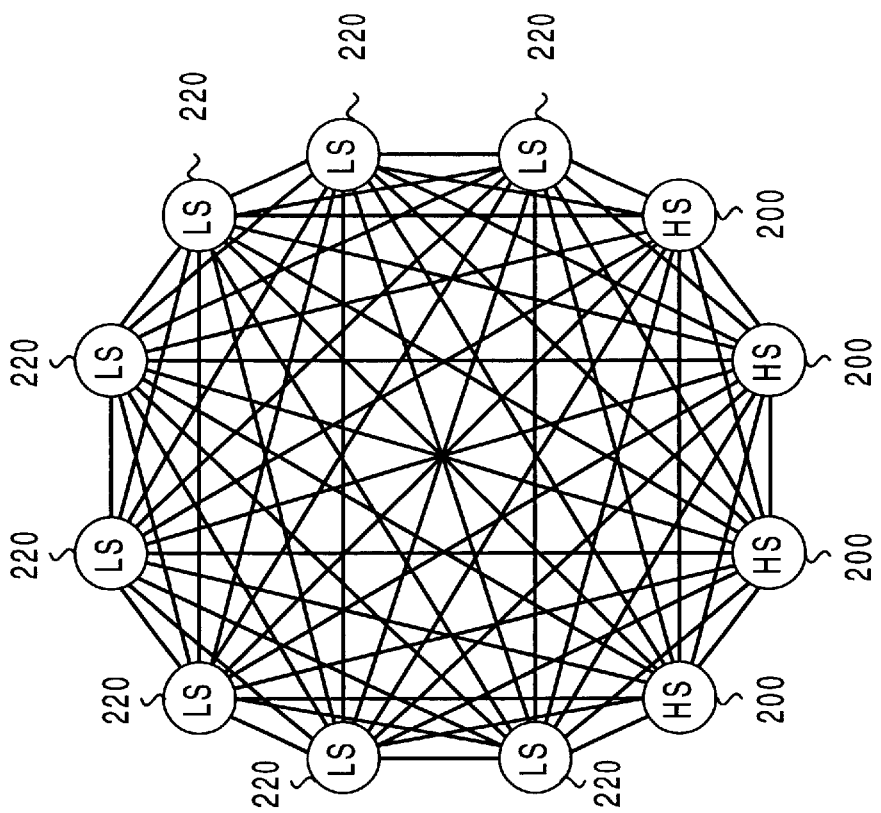
FIGS. 16A and 16B illustrate a mesh network created between low speed network interface cards and between low speed and high speed network interface cards respectively.
Figure 16A:
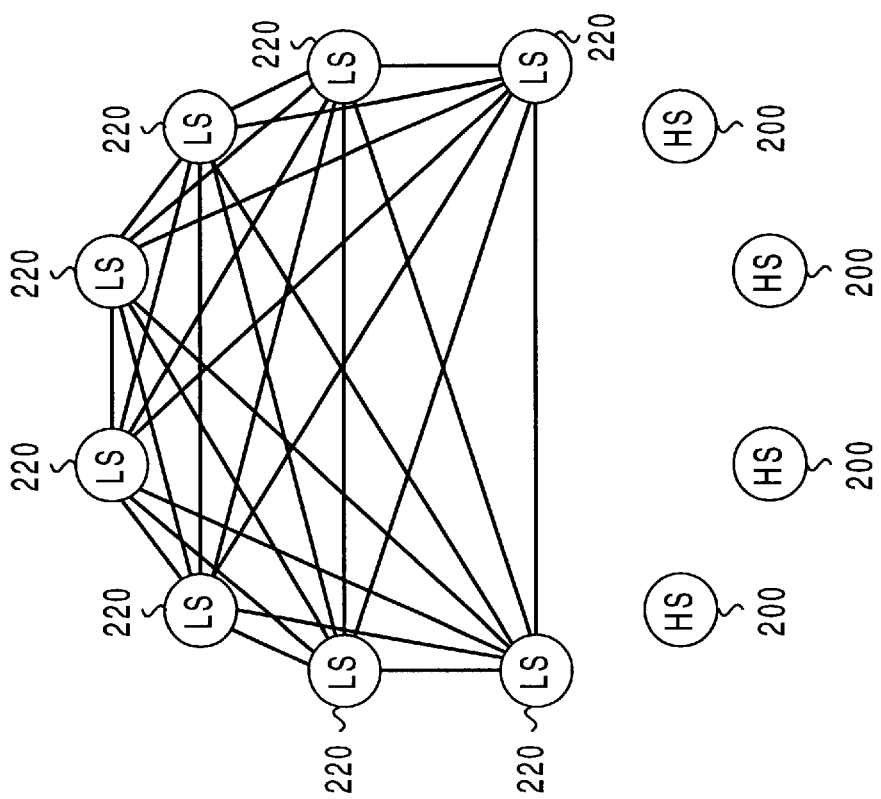

FIG. 16A illustrates an embodiment of a mesh network created by point-to-point connections between all low speed network interface subsystems 220. FIG. 16B illustrates another embodiment of a mesh network created by point-to-point connections between all high speed network interface subsystems 200 and all low speed network interface subsystems 220. The partial mesh and full mesh networks represented in FIGS. 16A and 16B respectively can be used to realize data planes 110 which encompass low speed network interface subsystems 220 and both low speed network interface subsystems 220 and high speed network interface subsystems 200 respectively.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A telecommunications cross-connect apparatus supporting multiple types of interface cards in a plurality of card slots comprising:
   (a) a cross-connect unit;
   (b) a control unit;
   (c) a plurality of interface cards;
   (d) a plurality of interface card slots; and
   (e) a star backplane wherein the star backplane provides connectivity between each interface card slot and the cross-connect unit and between each interface card slot and the control unit such that a first interface card from the plurality of interface cards can be cross-connected with a second interface card from the plurality of interface cards independent of the interface card slot in which said first interface card is located; and wherein point-to-point connections can be established among said plurality of interface cards without use of said cross-connect unit.

2. The apparatus described in claim 1 wherein the plurality of interface cards supports data connections at a data rate in the range of 10 Mb/s to at least 2.4 Gb/s.

3. The apparatus described in claim 1 wherein the plurality of interface cards supports optical interfaces having data rates in the range of 50 Mb/s to at least 2.4 Gb/s.

4. The apparatus described in claim 1 wherein the first interface card supports a first SONET ring, and wherein the second interface card supports a second SONET ring.

5. A telecommunications cross-connect apparatus supporting a cross-connection between signal paths on an interface card comprising:
   (a) a cross-connect unit;
   (b) a control unit;
   (c) an interface card;
   (d) an interface card slot; and
   (e) a star backplane wherein the star backplane provides connectivity between the interface card slot and the cross-connect unit and between the interface card slot and the control unit such that a first signal path on the interface card inserted into the interface card slot can be cross-connected with a second signal path on the interface card; and wherein point-to-point connections can be established among said plurality of interface cards without use of said cross-connect unit.

6. The apparatus described in claim 5 wherein the plurality of interface cards supports data connections in a data rate in the range of 10 Mb/s to at least 2.4 Gb/s.

7. The apparatus described in claim 5 wherein the plurality of interface cards supports optical interfaces having data rates in the range of 50 Mb/s to at least 2.4 Gb/s.

8. A telecommunications cross-connect apparatus electrical and optical interface cards in a plurality of cards slots comprising:
   (a) a cross-connect unit;
   (b) a control unit;
   (c) a first set of interface cards supporting optical interfaces;

(d) a second set of interface cards supporting electrical interfaces;

(e) a plurality of interface card slots; and (f) a star backplane wherein the star backplane provides connectivity between each interface card slot and the cross-connect unit and between each interface card slot and the control unit such that a first interface card from the first set of cards supporting optical interfaces inserted into one of the plurality of interface card slots can be cross-connected with a second interface card from the second set of interface cards supporting electrical interfaces independent of the interface card slot in which the first interface card is located; and wherein point-to-point connections can be established among said plurality of interface cards without use of said cross-connect unit.

9. A telecommunications cross-connect apparatus supporting multiple types of interface cards in a plurality of card slots comprising:

(a) a cross-connect unit capable of supporting a plurality of connections operating at speeds in the range of 2.4 Gb/s to at least 9 Gb/s;

(b) a control unit;

(c) a plurality of interface cards;

(d) a plurality of interface card slots; and (e) a star backplane wherein the star backplane provides connectivity between each interface card slot and the cross-connect unit using transmission paths supporting communications at rates in the range of 2.4 Gb/s to at least 9 Gb/s and which provides connectivity between each interface card slot and the control unit such that a first interface card from the plurality of interface cards can be cross-connected with a second interface card from the plurality of interface cards.

10. The apparatus described in claim 9 wherein the cross-connect between the first interface card from the plurality of interface cards and the second interface card from the plurality of interface cards is established independent of the interface card slot in which the first interface card is located.

11. The apparatus described in claim 9 wherein the cross-connect between the first interface card from the plurality of interface cards and the second interface card from the plurality of interface cards can be performed at a VT1.5 data rate.

* * * * *